United States Patent
Grayson et al.

(10) Patent No.: US 10,341,300 B2
(45) Date of Patent: Jul. 2, 2019

(54) SYSTEM, METHOD, APPARATUS AND MACHINE-READABLE MEDIA FOR ENTERPRISE WIRELESS CALLING

(71) Applicant: CISCO TECHNOLOGY, INC., San Jose, CA (US)

(72) Inventors: Mark Grayson, Maidenhead (GB); Gangadharan Byju Pularikkal, San Jose, CA (US); Mickael James Graham, Bellevue Hill (AU); Santosh Ramrao Patil, San Jose, CA (US); Peter Gaspar, Vienna (AT)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 15/044,957

(22) Filed: Feb. 16, 2016

(65) Prior Publication Data
US 2016/0255050 A1    Sep. 1, 2016

Related U.S. Application Data

(60) Provisional application No. 62/126,651, filed on Mar. 1, 2015.

(51) Int. Cl.
*H04L 29/06* (2006.01)
*H04W 76/12* (2018.01)
(Continued)

(52) U.S. Cl.
CPC ........ *H04L 63/029* (2013.01); *H04L 63/1408* (2013.01); *H04L 63/1425* (2013.01);
(Continued)

(58) Field of Classification Search
CPC ............... H04L 63/029; H04L 63/1408; H04L 63/1425; H04L 63/1433; H04L 63/0823; H04L 63/0272; H04W 84/12
See application file for complete search history.

(56) References Cited

U.S. PATENT DOCUMENTS 8,000,719 B1 *  8/2011  Lambert ............... H04W 64/00
                                              455/456.1
8,230,505 B1 *  7/2012  Ahrens ................. G06Q 10/02
                                              705/5

(Continued)

FOREIGN PATENT DOCUMENTS

| CN | 102883320 A   * | 1/2013  |            |
|----|------------------|---------|------------|
| WO | WO-2013177763 A1 * | 12/2013 | ........... H04L 45/745 |
| WO | WO 2014124666 A1 * | 8/2014  | ............. H04L 47/76 |

OTHER PUBLICATIONS

"How to use hosts file to override DNS for local testing," blog posted by Rick, Jun. 26, 2012 www.lifeasasysadmin.com/how-to-use-hosts-file-override-dns-for-local-testing/.

(Continued)

*Primary Examiner* — Eleni A Shiferaw
*Assistant Examiner* — Sher A Khan
(74) *Attorney, Agent, or Firm* — Patterson + Sheridan, LLP

(57) ABSTRACT

Embodiments include receiving one or more packets of a Wi-Fi calling session via a secure tunnel from a user device, where the user device is connected to a source network via a Wi-Fi access point. Embodiments also include determining whether the Wi-Fi calling session is a threat based, at least in part, on identifying an anomaly of at least one packet of the one or more packets. An action can be taken if the Wi-Fi calling communication is determined to be a threat. More specific embodiments include determining the at least one packet is associated with the Wi-Fi calling session by correlating information in the packet with control plane data of the Wi-Fi calling session. Further embodiments can include intercepting the one or more packets in a second (Continued)

secure tunnel established between an evolved packet data gateway and a service provider network associated with the user device.

20 Claims, 14 Drawing Sheets

(51) Int. Cl.
*H04W 12/12* (2009.01)
*H04W 84/12* (2009.01)
*H04W 88/16* (2009.01)

(52) U.S. Cl.
CPC ........ *H04L 63/1433* (2013.01); *H04L 63/164* (2013.01); *H04L 63/20* (2013.01); *H04L 65/1069* (2013.01); *H04W 12/12* (2013.01); *H04W 76/12* (2018.02); *H04L 63/0272* (2013.01); *H04L 63/0823* (2013.01); *H04W 84/12* (2013.01); *H04W 88/16* (2013.01)

(56) References Cited

U.S. PATENT DOCUMENTS

| | | | |
|---|---|---|---|
| 2008/0137565 A1* | 6/2008 | Chen | H04L 45/3065 370/310 |
| 2012/0240185 A1* | 9/2012 | Kapoor | H04L 63/1425 726/1 |
| 2012/0300757 A1* | 11/2012 | Lin | H04W 48/02 370/338 |
| 2013/0208729 A1 | 8/2013 | Evans et al. | |
| 2014/0273911 A1* | 9/2014 | Dunn | H04W 4/22 455/404.1 |
| 2014/0380434 A1* | 12/2014 | Li | H04W 4/24 726/4 |
| 2015/0163811 A1 | 3/2015 | Zhang | |
| 2015/0101053 A1* | 4/2015 | Sipple | H04L 63/1425 726/24 |
| 2015/0109967 A1 | 4/2015 | Hogan | |
| 2015/0350983 A1* | 12/2015 | Kwok | H04L 65/1069 370/331 |
| 2015/0381641 A1* | 12/2015 | Cabrera | H04L 63/1425 726/23 |
| 2016/0174107 A1* | 6/2016 | Kanugovi | H04L 12/28 370/236 |
| 2017/0055315 A1* | 2/2017 | Lin | H04W 48/08 |

OTHER PUBLICATIONS

"3GPP TS 33.402 V13.0.0 (Sep. 2015) Technical Specification: 3rd Generation Partnership Project; Technical Specification Group Services and System Aspects; 3GPP System Architecture Evolution (SAE); Security aspects of non-3GPP accesses (Release 13)," 3GPP, 650 Route des Lucioles—Sophia Antipolis Valbonne—France, Sep. 2015; 56 pages.

"Cisco NAM 2200 Series Appliances 4.2 Data Sheet," Cisco Systems, Inc., Apr. 2010; 12 pages.

"Chapter 4: Configuring an FQDN ACL," Cisco Systems, Inc., *Security Configuration Guide: Access Control Lists, Cisco IOS Release 15E*, First published on or about Jul. 8, 2014; 10 pages.

"Cisco Prime Virtual Network Analysis Module Data Sheet," Cisco Systems, Inc., Nov. 2015; 5 pages.

"Cisco NAM 2000 Series Appliances: Cisco Prime Network Analysis Module Software 5.1 Data Sheet," Cisco Systems, Inc., Dec. 12, 2013; 6 pages.

"Cisco Prime NAM 2400 Series Appliances with Software Version 6.2 Data Sheet," Cisco Systems, Inc., Jul. 2015; 9 pages.

"Cisco Nexus 7000 Switches Network Analysis Module (NAM-NX1) Data Sheet," Cisco Systems, Inc., Aug. 2013; 5 pages.

EPO Jul. 6, 2016 Extended Search Report and Written Opinion from European Application Serial No. 16157942; 6 pages.

Snygg, Peter, "Protection of Critical Telecom Network Resources" A Telecom Blog—BlueTC, May 22, 2014; 3 pages.

Norell, Lennart, "Wi-Fi Calling—Extending the Reach of VoLTE to Wi-Fi," *Ericsson Review*, Jan. 30, 2015; 8 pages.

Chinese Office Action for Application No. 201610113665.2 dated Sep. 5, 2018.

Lennart Norrell et al., "Wi-Fi Calling-extending the reach of VoLTE to Wi-Fi," Ericssn Review, Jan. 30, 2015, 7 pages.

Protection of Critical Telecom Network Resources, "Sophisticated attacks require real time intrusion detection and analytics," Peter Snygg, 3 pages.

\* cited by examiner

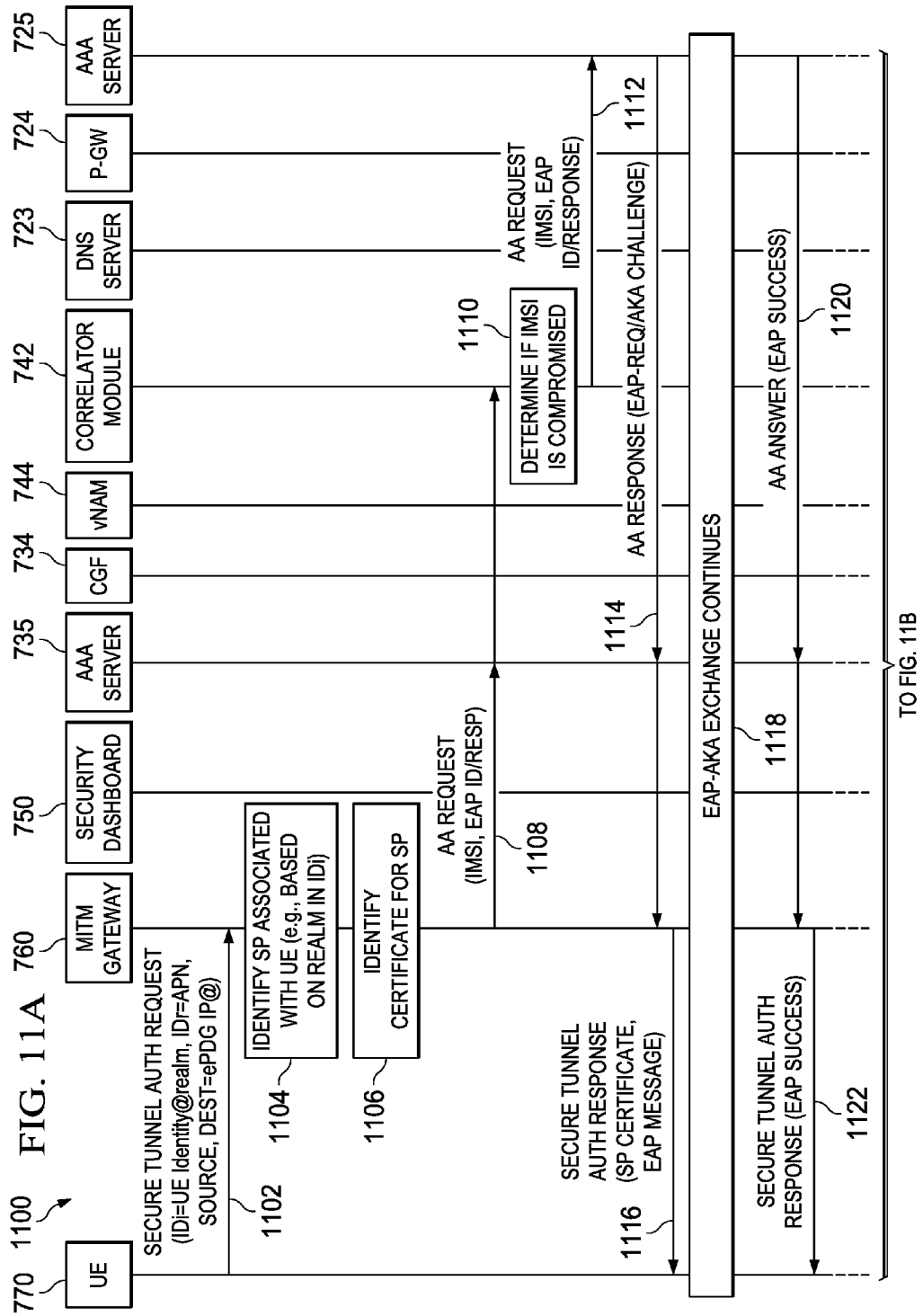

SYSTEM, METHOD, APPARATUS AND MACHINE-READABLE MEDIA FOR ENTERPRISE WIRELESS CALLING

CROSS-REFERENCE TO RELATED APPLICATION

This application claims the benefit of priority under 35 U.S.C. § 119(e) to U.S. Provisional Application Serial No. 62/126,651, entitled "SYSTEM, METHOD AND APPARATUS FOR ENTERPRISE WIRELESS CALLING," filed Mar. 1, 2015, which is hereby incorporated by reference in its entirety.

TECHNICAL FIELD

This disclosure relates in general to the field of computer networking, and more particularly, to a system, method, apparatus and machine-readable media for enterprise wireless calling.

BACKGROUND

Computer devices can enable users to communicate with other users operating other computer devices and to communicate with other computer devices all over the world via, for example, the Internet. Computer devices can use any number of communications technologies to enable network connectivity to the Internet or other networks for desired services, data, media, etc. With the advent of mobile devices and the increasing availability of wireless communication services, users can access the Internet and other networked systems from almost any venue at almost any time.

Entities such as service providers and enterprises often provide wireless (and wired) services for end users. For example, an enterprise may subscribe to a service provider to receive Internet access for the enterprise's clients. The enterprise may offer unlicensed wireless access (e.g., Wi-Fi) to clients present at a particular location. Some clients who are present at the same location may access the Internet or make calls (e.g., voice, video, etc.) using other technologies, such as licensed cellular access (e.g., 3G, 4G, etc.). Network traffic generated by clients via an enterprise's Wi-Fi offering or other technologies can provide enormous amounts of information associated with the clients, their devices, and the networks being utilized. Harnessing that information and ensuring the security of services that are accessible via the enterprise network, however, presents significant challenges to device manufacturers and network administrators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 11A-11C are simplified interaction diagrams illustrating additional possible communications between certain components of a Wi-Fi calling system according to at least one embodiment

DETAILED DESCRIPTION OF EMBODIMENTS

Overview

Figure 1:
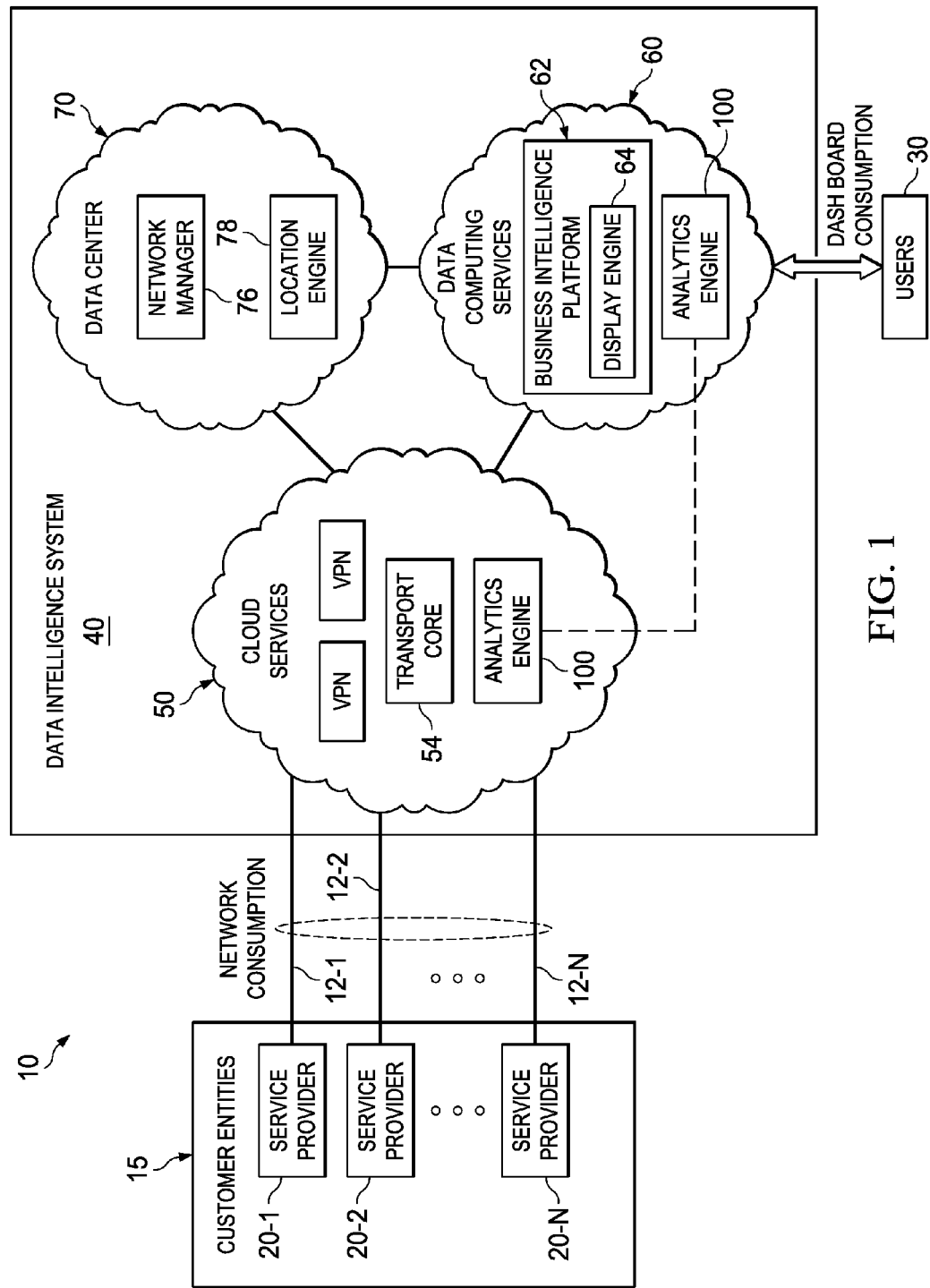
FIG. 1 is a simplified block diagram of one embodiment of a communication system in accordance with at least one embodiment of the present disclosure.

The present disclosure describes methods related to Wi-Fi calling from a source network. In one example of the present disclosure, a method is provided and includes receiving one or more packets of a Wi-Fi calling session via a secure tunnel from a user device, where the user device is connected to a source network via a Wi-Fi access point. The method further includes determining whether the Wi-Fi calling session is a threat based, at least in part, on identifying an anomaly of at least one packet of the one or more packets. The method also includes taking an action if the Wi-Fi calling communication is determined to be a threat.

In more specific embodiments, the method includes identifying a unique identity of the user device. Taking an action can include at least one of sending an alert that the Wi-Fi calling session is a threat and terminating the Wi-Fi calling session. Also, the secure tunnel can be an Internet Protocol Security (IPSec) tunnel. In yet more specific embodiments, the method includes determining the at least one packet is associated with the Wi-Fi calling session by correlating information in the packet with control plane data of the Wi-Fi calling session.

In yet more specific embodiments, one or more packets are intercepted in a second tunnel established between an evolved packet data gateway and a service provider network associated with the user device that initiated the Wi-Fi calling communication. The method can further include establishing a signaling link to the source network if the packet is determined to not be a threat, and sending a message to the source network over the signaling link to instruct the source network to prioritize network traffic associated with the Wi-Fi calling session. In further specific embodiments, the method includes receiving a request to establish the secure tunnel, identifying a service provider network associated with the user device, identifying a certificate representing the service provider, and sending the certificate to the user device. In addition, the Wi-Fi calling session can be redirected from the user device to a Wi-Fi roaming exchange based on one of a Domain Name System (DNS) overwrite in the source network or a destination Internet Protocol address provided by a Network Address Translation (NAT) system in the source network.

Further embodiments can include receiving one or more other packets of a second Wi-Fi calling session via a second secure tunnel from a second user device, where the second user device is connected to a second source network via a second Wi-Fi access point, and taking another action to protect the second network if the second Wi-Fi calling communication is determined to be another threat. In more specific embodiments, the one or more packets of the Wi-Fi calling session are received, via the secure tunnel, by an evolved packet node gateway (ePDG) in one of a secure cloud or the source network.

In another embodiment of the present disclosure, a method is provided and includes receiving a packet of a Wi-Fi calling communication from a user device connected to a source network via a Wi-Fi access point, identifying the user device, determining whether the user device is compromised based, at least in part, on one or more prior Wi-Fi calling sessions initiated by the user device, and taking an action based, at least in part, on a policy if the user device is determined to be compromised. In more specific embodiments, the method can include identifying a service provider associated with the user device, identifying a certificate representing the service provider, and sending the certificate to the user device if the user device is authenticated. In yet another specific embodiment, the method can include terminating the Wi-Fi calling communication if the user device is determined to be compromised.

Some or all of the elements, operations, and features may be included in respective systems, apparatuses, and devices for performing the described functionality. Furthermore, some or all of the features may be implemented in at least one machine readable storage medium.

Description

Turning to FIG. 1, a simplified block diagram of a communication system 10 for enabling enterprise wireless calling is provided. In one example, communication system 10 includes a data intelligence system 40 in communication with customer entities 15 and users 30. As used herein, a 'cloud' is intended to refer to remote network elements (e.g., servers, etc.) and/or software networks that allow storage, computing, and/or networking. A cloud may also provide online access to computer services or resources. Data intelligence system 40 can be based on a cloud infrastructure comprising cloud services 50, data computing services 60, and a data center 70. Cloud services 50 can provide secure connection to data center 70 and data computing services 60. Cloud services 50 can provide secure connections for streaming telemetry sensor data to/from networks of customer entities 15. In at least one embodiment, the secure connections may be in the form of a virtual private networks (VPNs) 12-1 through 12-N to a particular customer network, using a VPN protocol such as, for example, Internet Protocol Security (IPSec) to secure communications over the Internet.

Customer entities 15 may include any entities that provide network access services to their customers. Examples of customer entities 15 can include, but are not limited to service providers 20-1 through 20-N. Service providers may provide Internet access and other related services to their customers. Customers of a service provider could include a myriad of entities (e.g., enterprises, event venues, convention centers, shopping centers, retail merchants, restaurants, etc.) or end users.

In at least one embodiment, data center 70 may host a location engine 78 that provides a location services platform for service deployments delivered over Wi-Fi. Data center 70 may also include a network manager 76, which is a management platform for service deployments delivered over Wi-Fi. In at least one embodiment, data computing services 60 can host a display engine 64 and at least a portion of an analytics engine 100. The display engine can be a user interface (UI/Web-tier) of a business intelligence platform (BIP) 62 and may be accessed by users 30 to obtain real-time visibility into network, user, and business data intelligence derived from network traffic traversing their monitored networks. Typically, users 30 accessing the display engine could be associated with customer entities 15. For example, users 30 could include authorized persons of a service provider and/or authorized persons of an enterprise that is the customer of the data intelligence system provider. In some scenarios, users 30 may include network administrators or operators. In at least one embodiment, however, any authorized user who provides appropriate authentication may access the display engine. Other third party users (not shown), who have authorization and appropriate credentials, may access an application programming interface (API) to build applications for service providers and/or their customers.

For purposes of understanding certain embodiments of communication system 10 disclosed herein, it is important to appreciate the technologies and data that may be associated with network communications traversing the network. The following foundational information may be viewed as a basis from which the present disclosure may be properly explained.

Entities that provide services or goods to end users (or clients) often offer free or fee-based network access to those end users when they are present at the premises of the entity. For example, an event venue hosting a football game may offer free Wi-Fi access for user equipment (UE) (e.g., smart phones, tablets, laptops, etc.) operated by end users attending the football game. The Wi-Fi access to the Internet may be provided by a service provider of the event venue. In another example, a business may also offer free Wi-Fi access for UEs operated by its employees visiting its premises. The Wi-Fi access to the Internet may be provided by a service provider of the business owner.

Wi-Fi calling from a business premise or event venue, however, is not generally offered due, at least in part, to the secure tunneling on which Internet Protocol (IP) calling is built. Some end users may use licensed cellular technologies (e.g., 3G, 4G, etc.) to access the Internet and make calls (e.g., voice and/or other media). Yet other end users at the business premise or event venue may access the Internet via a wired connection. The amount of network traffic generated by the end users could be significant. In addition, data associated with the network traffic could indicate potentially useful information related to the network and end users.

Providers of network elements in the network often provide management tools for those network elements. A management tool may be provisioned to manage a particular one or more network elements within the network, and to provide network information related to those network elements. Disparate sources of network information with distinct management tools, however, do not enable intelligent exploitation and utilization of such information. Moreover, the various network access options (e.g., unlicensed Wi-Fi, licensed small cells, licensed macro cells, wired, etc.) that are available to end users hinders the ability of a business or event venue and its service provider to efficiently collect and evaluate network traffic data in a meaningful way.

If end user and network information that is present in network traffic could be efficiently harvested, aggregated, correlated, analyzed, and visualized, then service providers could help their customers (e.g., enterprises, schools, event venues, convention centers, shopping centers, retail merchants, restaurants, etc.) make better business decisions and provide better end user experiences to their clients (e.g., end users). In addition, access to this network information could drive automatic responses in the monitored network based on the analyzed network information and business rules put in place by a customer entity and/or its customer associated with the monitored network.

In addition to harnessing network information available on an enterprise network, enterprises also want to ensure the security of enterprise services accessible via their local area network (LAN). Generally, enterprises want to restrict Internet Protocol Security tunnel communications outbound from user devices (also referred to herein as 'user equipment' or 'UEs') on their local area networks (LANs). Wi-Fi calling is built on a foundation of long lived IPSec session from a user device at the enterprise premise into a service provider environment. Enterprise information security concerns typically focus on threats of using the IPSec tunnel to attack the enterprise network. A user device with an IPSec session established from an enterprise premise via a service provider to the Internet may also have access to enterprise services via an enterprise LAN. Malware on the user device could potentially intercept enterprise packets and tunnel those to a head end that is off the enterprise environment. Consequently, using the IPSec tunnel to avoid enterprise perimeter security controls is a significant concern. Thus, enterprise networks typically include a firewall that prevents the establishment of outbound secure tunnels (e.g., IPSec tunnels) from user devices.

Enterprises often address security concerns by becoming a man-in-the-middle. On secure sockets layer (SSL) and transport layer security (TLS) connections the man-in-the-middle can ensure that all enterprise managed user devices have a root certificate included to enable visibility into the network traffic through the encrypted tunnel between the enterprise host and the destination node. Wi-Fi calling, however, with its mutual authentication, hinders the ability of an enterprise to become a man-in-the middle. Additionally, when accounting for large enterprises where many users wish to establish Wi-Fi calling service to their home operators, scaling can become a problem (e.g., scaling to tens or hundreds of operators for a multi-national enterprise). Better security options are needed for enterprises to secure their networks when offering Wi-Fi calling capabilities to their clients.

For ease of reference herein, a customer entity may be referred to as a 'service provider.' Also for at least some embodiments described herein, a service provider has its own customer in the form of an enterprise. In some scenarios, an enterprise and a service provider could be customers of a provider associated with a data intelligence system. In addition, the enterprise's customers, whose network traffic is being monitored, may also be referred to herein as 'end users' or 'clients'. It should be understood, however, that customer entities 15 could include other entities that provide network access to end users. For example, a service provider can have customers in the form of end users, who operate user equipment (UE) to access the mobile wireless services provided by the service provider. It should also be understood that a service provider could have any number of customers and such customers could include any type of entity or user that receives network access services from the service provider.

Communication system 10 can solve the aforementioned issues (and more). Data intelligence system 40 of communication system 10 provides a hosted business intelligence service and a managed Wi-Fi calling termination service for service providers. Data intelligence system 40 can be accessed by service provider users and enterprise users, such as network operators for example, via the display engine of business intelligence platform (BIP) 62. In at least one embodiment, the BIP provides a single location to manage, monitor, and monetize the network.

With communication system 10, a service provider can easily scale their managed Wi-Fi service by leveraging the infrastructure and management capabilities of communication system 10. Additionally the service provider can leverage the value provided by the business intelligence platform (BIP) for both their existing Wi-Fi deployments and any managed Wi-Fi service. The BIP can provide a user interface (UI) that will be available to service providers and their enterprise customers. Data intelligence system 40 can also allow for additional innovation by providing an application programming interface (API) that can be accessed by third party application developers.

Data intelligence system 40 provides appropriate architecture and systems to gather telemetry sensor data (also referred to herein as 'sensor data') from a network of a service provider and its enterprise customer, analyze it, and then build actions that can be automated based on the data. At least some of the sensor data can be in the form of individual end user usage data. BIP 62 may find user patterns such as time of day when most end users are present, it may allow for premium end users to be identified as they enter the premises of the enterprise, or it may provide new business opportunities specifically around targeted advertisements. The network from which sensor data is gathered is also referred to herein as 'monitored network.' This monitored network, or portions thereof, can be on the premises of the service provider or of the enterprise customer of the service provider. At least some portions of the monitored network could be hosted by another entity entirely, including, but not limited to, data intelligence system 40.

In at least one embodiment, data intelligence system 40 supports three components for deriving intelligent data from a monitored network: 1) access point (AP) statistics, 2) usage analytics, and 3) location analytics. Data intelligence system 40 collects AP statistics and health information from the monitored network. Data intelligence system 40 also collects per end user usage data via, for example, NetFlow, which can be enabled on a wireless LAN controller (WLC) and routers that support subscriber gateway or access gateway functionality. Access points (APs) may be configured to continuously report user equipment (UE) activity to the WLC. Key fields may include source and destination IP addresses, application, protocol, source and destination ports, number of packets, number of octets, client media access control (MAC) address, and Wi-Fi AP MAC address. In addition, data intelligence system 40 can collect individual end user location data via location engine 78.

It should be noted that data intelligence system 40 is not limited to only the above identified components for deriving intelligence data. Other components for deriving intelligence data from a monitored network and/or other types of sensor data are intended to be within the broad scope of this disclosure and can be readily incorporated in data intelligence system 40. For example, at least some embodiments can include a Wi-Fi calling system that enables the use of a Wi-Fi calling application on user equipment while protecting a secure tunnel established for a Wi-Fi calling session via a source network of an enterprise or other entity. In these embodiments, data intelligence system 40 may also collect access network statistics related to the monitored source network. Subscriber gateway functionality may be configured to continuously report UE activity, for example, using authentication, authorization, and accounting (AAA) records, and/or call detail records (CDRs). Information reported in the records can include, but is not necessarily limited to, source and destination IP addresses, application, protocol, source and destination ports, number of packets and number of octets. In addition, data intelligence system 40 can collect individual end user location data via location analytics module 106.

Sensor data may be collected across Wi-Fi, cellular (e.g., 3G, 4G, nG, LTE, etc.), or any other suitable wireless technology. Various analytics may be performed on the data to produce intelligent reports and provide visibility into the data via a user interface. Analytics may comprise any type of data aggregation, analysis, correlation, comparison, normalization, enrichment, mining, etc., or any combination thereof. BIP 62 may use APIs provided by these components to configure the components, display the data, and provide reports for users. Authorized third parties may also access the data via an appropriate API (e.g., Representational State Transfer (REST) API).

Types of intelligent data that can be generated by the BIP and exposed through APIs can include network intelligence data, user intelligence data, and business intelligence data. Data that may be desirable to a user (e.g., network operator of an enterprise) for business purposes includes, but is not limited to, 1) which social media websites end users access, 2) where end users physically go within the enterprise (or other entity), and 3) whether an end user is behaving illegally (e.g., live streaming a concert) or without authorization. Examples of data that may be desirable to a user (e.g., network operator of an enterprise) for network purposes include, but are not limited to, 1) how much network traffic is traversing the network, 2) what type of traffic is traversing the network (e.g., bit-torrent, VoIP traffic, etc.), 3) how many licensed users (e.g., 3G/4G/LTE users) are connected, and 4) the concentration of network traffic in particular areas of the network (e.g., percentage on a particular service set identifier (SSID), etc.

Data intelligence system 40 can also provide a Wi-Fi roaming exchange that enables security analytics for Wi-Fi calling sessions established by user equipment from a source network (e.g., an enterprise network) over an outbound secure tunnel. The Wi-Fi roaming exchange can obtain visibility into user flows, which can be correlated to control plane data of the Wi-Fi calling session. This correlation enables identification of the source network and the service provider to which the calling communications are directed. Security analytics can be derived from the user flows in order to detect any anomalous packets being sent over the secure tunnels, such as an Internet Protocol Security (IPSec) tunnel between the source network and the Wi-Fi roaming exchange.

The Wi-Fi roaming exchange can offer tools and visibility into the Wi-Fi calling communications via a portal in at least one embodiment. The Wi-Fi roaming exchange can also automatically mitigate detected threats by taking an action such as de-authorizing the user equipment. This may be accomplished, for example, using the UE's International Mobile Subscriber Identity (IMSI)). Such actions may be taken automatically based on pre-configured policies or, in at least some instances, on instructions provided by an authorized user via the portal. Visibility via a portal can provide a level of confidence for an enterprise (or other entity/user/owner associated with a source network) that the outbound secure tunnels are not being used to attack the source network, such that outbound secure tunnels can be supported across the source network. In addition, Wi-Fi calling communications may be terminated before the secure tunnels are established if the user equipment is determined to have previously been compromised. In a further embodiment, a Wi-Fi roaming exchange may be configured to instruct the source network to prioritize user flows of a Wi-Fi calling session. These instructions may be based on policies associated with the source network.

Turning to FIG. 1, a description of the possible infrastructure of communication system 10 is now provided. Communication system 10 may support multiple services or may be implemented to provide a single service instance for each service provider supporting a single tenancy framework for each SP. In FIG. 1, the logical connectivity between a service provider network and cloud services 50 is shown. Secured connection such as VPNs 12-1 can be established between a service provider, such as service provider 20-1, and cloud services 50. Each service provider can be connected to cloud services 50 via a VPN such that the network traffic of each SP is isolated within its corresponding VPN and virtual routing and forwarding (VRF) configurations. One or more data intelligence systems 40 may be established to provide the data intelligence services to service providers 20-1 through 20-N, and secure connections may be established between multiple data intelligence systems.

Various components may be provisioned in data intelligence system 40 including, but not limited to display engine 64, location engine 78, network manager 76, and a gateway (not shown) for transforming a legacy protocol into a different protocol via custom build adaptors. These components may be configured using network functions virtualization (NFV), which is a network architecture concept that virtualizes network node functions. Each of these NFVs can have their own cluster domain or its auto-scaling group.

In at least one embodiment, data computing services 60 may be provisioned with the display engine. One example of data computing services 60 could be a cloud that offers Infrastructure as a Service (IaaS) and Platform as a Service (PaaS). The display engine components can include a presentation tier (e.g., a web server), a service tier (e.g., an IQ engine), and a database, for example.

In at least one embodiment, cloud services 50 can be the core of data intelligence services 40. In at least one embodiment, cloud services 50 can include a transport core, a portal re-direction, and mail/SMTP (not shown). The transport core can comprise all the connectivity to various other key elements residing in other clouds such as data center 70, and the display engine and user analytics, which may be part of the analytics engine, in data computing services 60. The transport core can also link the other components in data intelligence system 40 together. Such components may include a customer VPN, portal re-direction, and mail/SMTP. In at least some embodiments, cloud services 50 may also host at least a portion of analytics engine (i.e., data layer core) 100.

Analytics engine 100 may comprise multiple components for performing various analytics on sensor data. Components of the analytics engine may be provisioned in different clouds or in the same cloud, depending on particular configuration requirements and/or needs. As shown in FIG. 1, the analytics engine could be provisioned across multiple clouds. For example, a usage analytics module of the analytics engine may be provisioned in cloud services 50, while other modules of the analytics engine (e.g., a location analytics module and an access point statistics module) may be provisioned in data computing services 60.

It will be apparent that the cloud infrastructure of data intelligence system 40 could be configured in numerous ways. Although various components herein are described as being provisioned in particular clouds as shown in FIG. 1, these components may be provisioned in more, less or other clouds or may be provisioned together in a single cloud such as, for example, cloud services 50. Thus, the NFVs and other components of data intelligence system (e.g., the analytics engine, the business intelligence platform (BIP), etc.) could be instantiated in a single cloud or in any number of other clouds. FIG. 1 is one example of numerous possible implementations.

Figure 2:
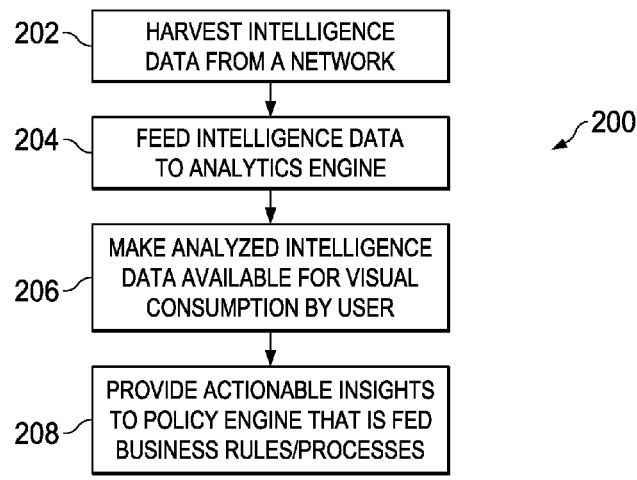
FIG. 2 is a simplified flowchart illustrating example operations that may be associated with the communication system in accordance with at least one embodiment of the present disclosure.

Turning to FIG. 2, a high level and simplified flowchart illustrates a flow 200 of possible operations associated with communication system 10. At 202, sensor data is harvested from a monitored network. In at least one embodiment, cloud services 50 can harvest the sensor data by streaming through a VPN from network elements such as a WLC from a monitored network, which could be a service provider's network, for example. In at least one other embodiment involving a Wi-Fi calling system, cloud services 50 can harvest the sensor data by interfacing to a subscriber gateway and/or by analyzing traffic traversing a subscriber gateway. At 204, the sensor data is fed to analytics engine 100 in data intelligence system 40 to be analyzed to enable intelligent reports and visual representations of the data to be produced. As used herein, 'analyzing' data is intended to mean to perform or apply analytics (e.g., evaluation, correlation, comparison, analysis, etc.) on the data. These reports and visualizations can relate to user, network, and/or business intelligence.

At 206, the analyzed intelligence data is made available for consumption by a user. In at least one embodiment, the analyzed intelligence data is consumable via a graphical user interface (e.g., dashboard generated and provided for display by a display engine) that is accessible through data intelligence system 40 by authorized users. At 208, actionable insights derived from the analyzed sensor data may be provided to a policy engine. The policy engine can receive business rules/processes to be used for generating network policies for the monitored network, based on the insight and the rule or rules applied to the insight.

Figure 3:
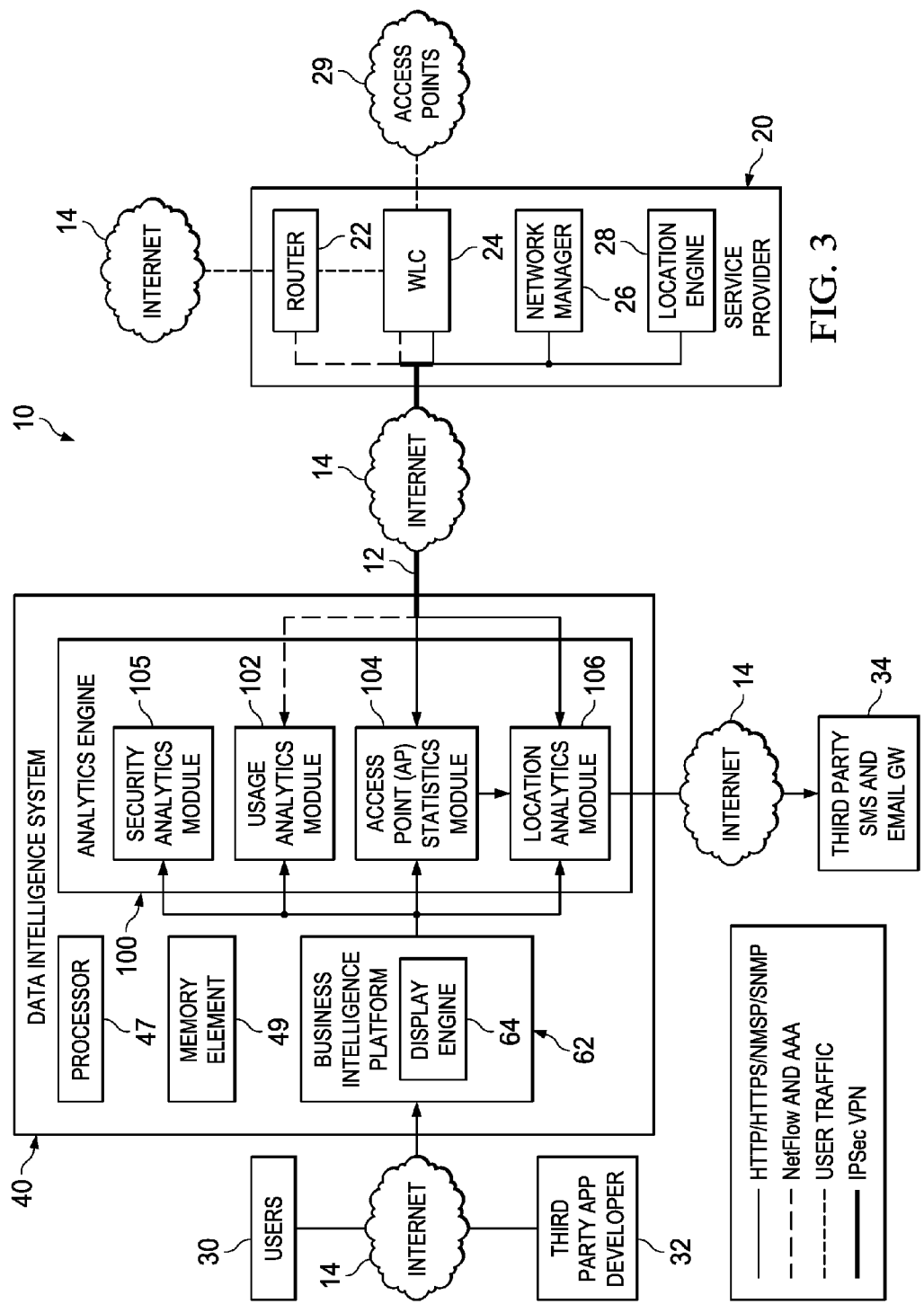
FIG. 3 is a simplified block diagram of one embodiment of system architecture of the communication system in accordance with at least one embodiment of the present disclosure.

Turning to FIG. 3, a simplified block diagram of an example architecture of communication system 10 is illustrated. Service provider 20, which is representative of one or more service providers (e.g., 20-1 through 20-N) that may be provisioned in communication system 10, comprises a router 22, a wireless local area network controller (WLC) 24, a network manager 26, and a location engine 28. One or more access points (APs) 29 may be in communication with WLC 24. Service provider 20 connects to data intelligence system 40 via the Internet. A user 30, a third party application developer 32, and/or a third party short message service (SMS) and email gateway 34 may connect to data intelligence system 40 via the Internet. Data intelligence system 40 can comprise an analytics engine 100, which can include a usage analytics module 102, an access point (AP) statistics module 104, and a location analytics module 106. Data intelligence system 40 also includes a business intelligence platform 62. Data intelligence system 40 may further include a security analytics module 105. Security analytics module 105 may be configured as part of analytics engine 100 in at least one embodiment. In at least one embodiment, security analytics module 105 may be provisioned with a Wi-Fi calling system.

In at least one embodiment, BIP 62 can be a multi-tiered web application, including a web user interface (also referred to herein as display engine 64) and an external application programming interface (API). BIP 62 can provide the link between the network data that has been gathered and the users who consume it in a usable form. In at least one embodiment, multiple tiers are used to de-couple layers and provide scalability, security, and robustness over the lifetime of the application. The tiers may communicate via published APIs. In at least one embodiment, users 30 (e.g., authorized persons of service provider 20 and/or authorized persons of the enterprise customer of service provider 20) can access a user interface of business intelligence platform (BIP) 62 over the Internet via Hypertext Transfer Protocol Secure (HTTPS).

BIP 62 may be configured to allow third party application developers 32 to access its API to build applications. For example, developers 32 may access the API of BIP 62 over the Internet via HTTPS to build additional value for service providers or their enterprise customers. These applications may be developed by any authorized and authenticated user, including developers of service providers, enterprises, or any other entity given the appropriate credentials for access. The BIP API may allow for both pulling and pushing data in at least one embodiment. BIP 62 and location analytics module 106 can also leverage third party services, such as short message services (SMSes) from SMS providers over the Internet via HTTPS. For example, to send an SMS to interested parties, data intelligence system 40 may use a third party SMS service as indicated at 34. Some or all of the various accesses to data intelligence system 40 may be authenticated.

Service provider 20 can integrate its existing Wi-Fi service deployment into data intelligence system 40 to enable business intelligence to be generated. Telemetry sensor data (also referred to herein as 'sensor data') from the service provider's monitored network (or networks) can be streamed to analytics engine 100 via a secure channel 12. The secure channel could be a virtual private network running Internet Protocol Secure (IP Secure), for example. Secure channel 12 is representative of one of the VPNs 12-1 through 12-N, which are illustrated in FIG. 1. A site to site connection can be created that gives components of data intelligence system 40 access to certain network elements of service provider 20. An IPSec termination component terminates the site to site tunnel from the service provider to the data intelligence system so that business intelligence data can securely traverse the Internet. As overlapping networks may be present, the IPSec termination component may perform network address translation (NAT) to make these overlaps are transparent to both sides. Certificates or pre-shared keys may be used to secure the communication.

In at least one embodiment, network elements in the service provider's network that stream sensor data to analytics engine 100 can include router 22, WLC 24, network manager 26, and location engine 28, where access points feed the WLC. In at least one embodiment, business intelligence data is sent to analytics engine 100, while user traffic is offloaded at service provider 20.

In an embodiment, router 22 may provide at least two functions. First, router 22 may act as an intelligent services gateway (ISG) supporting the Wi-Fi deployment. In this mode, router 22 controls access for authenticated sessions. Router 22 may also gather per user usage data and stream this sensor data to analytics engine 100. This can be achieved when router 22 is acting as the ISG or as a layer 3 router. In at least some implementations, router 22 is hosted at the premises of service provider 20. By way of example, an Aggregation Services Router 1000 Series (ASR1K), offered by Cisco Systems, Inc., of San Jose, Calif., may be provisioned as router 22.

WLC 24 is a network element that manages Wi-Fi access points (APs). WLC 24 may use Control and Provisioning of Wireless Access Points (CAPWAP) protocol. The management may be performed over datagram transport layer security (DTLS), which is secured with certificates. Typically, WLC 24 handles both control and data planes. In some architectures, however, the WLC handles the control plane and the data plane is offloaded at the Wi-Fi AP. In at least one embodiment, WLC 24 handles both the control and data planes to enable business intelligence data to be collected and streamed to analytics engine 100. In at least some implementations, WLC 24 is hosted at the premises of service provider 20.

Network manager 26 is a management platform for Wi-Fi deployments and may be used by AP Statistics module 104. Network manager 26 can return statistics and details of the deployment to analytics engine 100. Network manager 26 integrates with location engine 28 to provide map and Wi-Fi AP data. Location engine 28 can be a location services platform for Wi-Fi deployments and is used by the location analytics module 106. Location engine 28 receives updates from WLC 24 (e.g., over a protocol such as network mobility service protocol (NMSP)) and can use these updates to calculate the location of the clients. Location engine 28 can return one or more location metrics indicating the client's current location as well as historical location data to analytics engine 100. Location engine 28 can also provide a stream of location updates which is consumed by location analytics module 106. In at least one embodiment, network manager 26 and location engine 28 can return the aforementioned sensor data to analytics engine 100 by using a Representational State Transfer (REST) API (e.g., Javascript Object Notation (JSON) over HTTP). Network manager 26 and location engine 28 may be hosted in the cloud infrastructure of data intelligence system 40 or at the premises of service provider 20. For illustrative purposes, in FIG. 1, a network manager (e.g., network manager 78) and a location engine (e.g., location engine 76) are shown as part of the cloud infrastructure (e.g., data center 70).

In at least some embodiments, analytics engine 100 receives sensor data from service provider 20. For embodiments involving a Wi-Fi calling system, analytics engine 100 could receive sensor data from security analytics module 105 and gateways (e.g., evolved packet data gateways) that receive and forward Wi-Fi calling communications. Analytics engine 100 can aggregate, normalize, enrich, correlate, and otherwise analyze the sensor data in order to provide intelligent visualizations of the data for user 30. In at least one embodiment, three main components are implemented in analytics engine 100. First, in at least one embodiment, usage analytics module 102 collects, normalizes, and enriches network usage data gathered from the service provider's network for use by BIP 62. Usage analytics module 102 receives streams of user metrics indicating per user usage data from both local elements and elements housed externally by the service provider. On receiving the usage data, usage analytics module 102 can enrich it with additional information that may be accessible (e.g. location information from location engine 28) or with previously received data (e.g. the Wi-Fi AP the client is using). Each flow can be normalized and stored in both a historic database and an online database which can be optimized for fast retrieval, for example, via a REST API. Usage analytics module 102 may be horizontally scaled by adding instances and introducing a load balancer.

Second, in at least one embodiment, AP statistics module 104 collects, normalizes, and enriches AP statistics gathered from the service provider's network for use by BIP 62. AP statistics module 104 can poll network manager instances (e.g., network manager 26) for AP statistics. The polling AP statistics module 104 may then store the received AP statistics data in a searchable manner that allows for fast access by BIP 62.

Third, in at least one embodiment, location analytics module 106 collects, normalizes, and enriches location data received from location engine 28 for use by BIP 62. Location analytics module 106 receives a stream of location data from the location engines (e.g., location engine 28). The received location data may then be stored in a searchable manner that allows for fast access by BIP 62. Analytics may be provided on this data. BIP 62 can access location analytics module, for example, via a published REST API. BIP 62 may also update location analytics module 62 with deployment dimension data such as, "This AP is part of this deployment in this market." Such dimension data enables enhanced queries. Location analytics module 106 may be horizontally scaled by adding instances and introducing a load balancer.

Security analytics module 105 is another component that may be provided in analytics engine 100. In security analytics module 105, user flows can be received and correlated with control plane data derived from Wi-Fi calling communications. Security analytics can identify the source network, the UE that initiated a Wi-Fi calling session, and the service provider to which the UE is subscribed. Security analytics module 105 can evaluate user flows to determine whether the flows are malicious and thus, whether the UE is compromised. This information can be leveraged with the control plane data to take corrective actions based on policies.

The particular system architecture illustrated in FIG. 3 provides several advantages. First, communication system 10 is agnostic to access type (e.g., unlicensed Wi-Fi, licensed cellular, wired) used by clients on their user equipment. The network control path is correlated from various network telemetry sensors provisioned in the monitored network. Sensor data may be continuously streamed from various network elements in the monitored network to data intelligence system 40. In at least one embodiment, streaming network telemetry sensors include:
   a. Location information streaming data is derived from the location engine;
   b. User/device flow information streaming data for AVC/DPI is derived from WLC/ISG;

c. User/subscriber information streaming data is derived from the AAA;
d. User equipment IMSI/MSISDN related cellular information streaming data is derived from the GTPv2 tap or IPNE from the packet core;
e. SNMP trap data and syslog data is derived from network devices; and
f. NMSP feed is received from WLC for the client RSSI/SNR related data, etc.

Sensor data may be normalized using any suitable format, put in a message distributor, fed into a use case topology, enriched in the data ingest and data enrichment components, respectively. This enriched data set, correlated in time series for specific events across these multiple sensors with each providing bits of information into the enriched final data set, can be added to real-time, long-term and archived data stores with special data bases optimized for big data. This enriched data set may be exposed for exploratory analytics via a high performance API engine which is leveraged by the presentation layer. These components and modules can be stitched together over an inter-cloud fabric hybrid (e.g., public and private clouds). In at least one embodiment, multiprotocol label switching traffic engineering VPN may be used.

Figure 4:
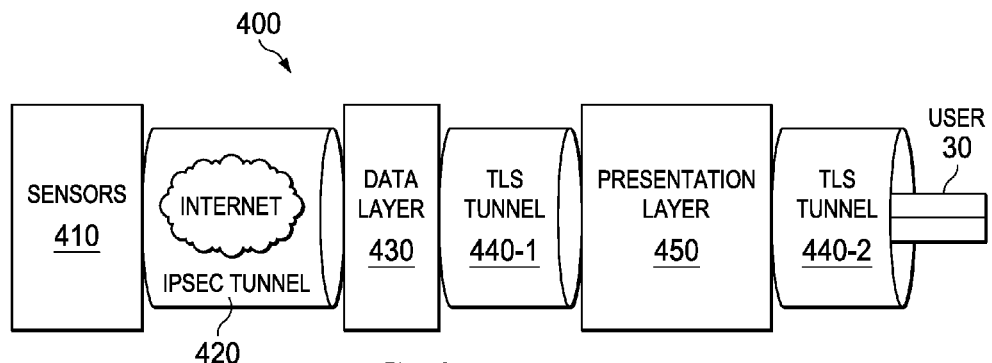
FIG. 4 is a high level block diagram of components and data flow in a communication system in accordance with at least one embodiment.

FIG. 4 is a high level block diagram depicting some possible layers 400 of communication system 10 associated with analytics engine 100. Telemetry sensor data is streamed from sensors 410 over a secure tunnel 420 (e.g., IPSec Tunnel), towards a big data platform hosted in a cloud infrastructure. One example of the secure tunnel could be virtual private network 12, and one example of a data platform in a cloud infrastructure could be data center 70. A data layer 430 consumes this data and exposes it in the form of an API via a Transport Security Layer (TLS) 440-1 to presentation layer 450. In at least one embodiment, a single API may be used to expose the data to the presentation layer. This exposed data is consumable to an end user (e.g., service provider, enterprise, any third party ecosystem interested in the data that is authorized to access the data). For example, user 30 may consume the data through a dashboard generated by display engine 64. A second TLS tunnel 440-2 may enable the display engine 64 to receive the data.

Figure 5:
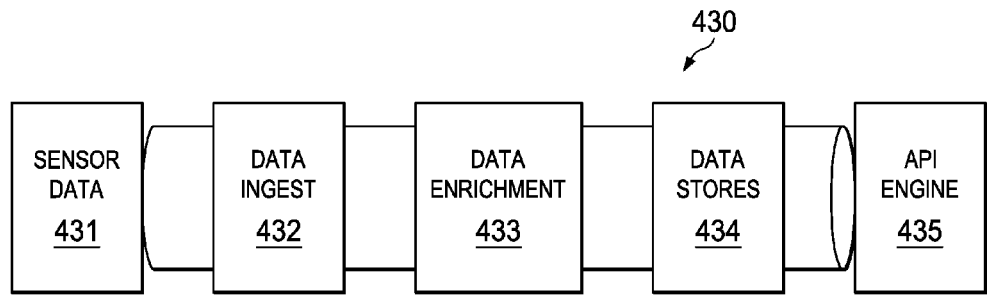
FIG. 5 is a high level block diagram of possible data flow progression in a communication system in accordance with at least one embodiment.

FIG. 5 illustrates more details that may be associated with data layer 430 of communication system 10. The data layer may comprise sensor data 431, a data ingest 432 of the received sensor data, a data enrichment 433 of the received sensor data, data stores 434 for storing the enriched sensor data, and an API engine 435 that exposes the enriched sensor data. The data layer may be hosted in the cloud infrastructure of data intelligence system 40. Appendix A also illustrates Core Elements that provides possible details of circuit boards provisioned in network elements associated with the Data Layer of communication system 10.

Figure 6:
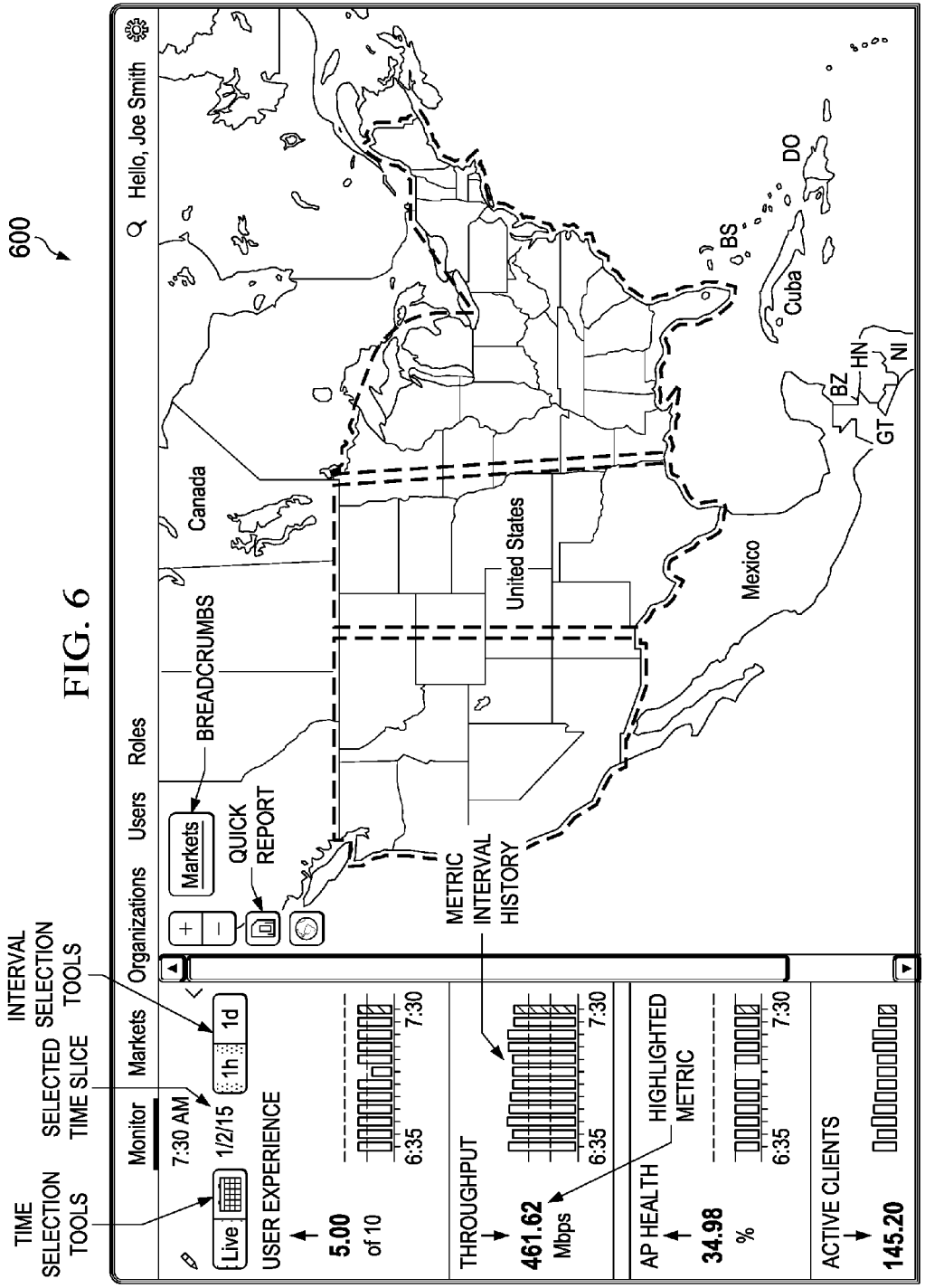
FIG. 6 is an example screen display providing a single pane visualization of intelligence data of the communication system in accordance with at least one embodiment.

Turning to FIG. 6, an example screen 600 of one possible embodiment is illustrated. The graphical and numerical portions of example screen 600 may generated based on analyzed data from the analytics engine that is exposed by an API. In at least one embodiment, example screen 600 may be provided for display by the display engine of data intelligence system 40, via a graphical user interface of a display element of a computer device. Example screen 600 provides the derived network, user, and business intelligence information using metrics to quantify the information. The metrics may be displayed in a single pane on a display element of a computer device. For example, screen 600 shows network intelligence data (e.g., 'AP Health') and user intelligence data (e.g., 'User Experience'). The single pane could also provide access to various tools to manipulate the presentation of the data based on the user's desired parameters.

Wi-Fi Calling System

Turning to FIGS. 7A-12, possible embodiments of a Wi-Fi calling system 700, which is configured to enable the use of a Wi-Fi calling application in user equipment and to protect the use of an IPSec tunnel, are illustrated and more detailed descriptions thereof are now provided. As shown in FIGS. 7A-12, a Wi-Fi roaming exchange is defined in Wi-Fi calling system 700 and can provide an authorized man-in-the-middle service to enterprise customers with UEs. In a least one embodiment, Wi-Fi calling system 700 could be provisioned with communication system 10 or a portion of communication system 10. It will be apparent that Wi-Fi calling system 700 and any features and components of communication system 10 may be integrated or combined in any suitable manner based on particular implementations and needs. It will also be apparent, however, that Wi-Fi calling system 700 could be provisioned separately from communication system 10.

Figure 7A:
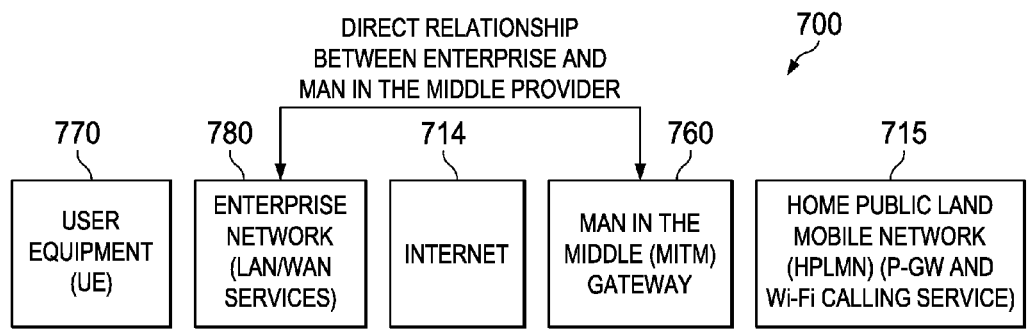
FIG. 7A is a high level block diagram of example components of a Wi-Fi calling system according to at least one embodiment.
Figure 7B:
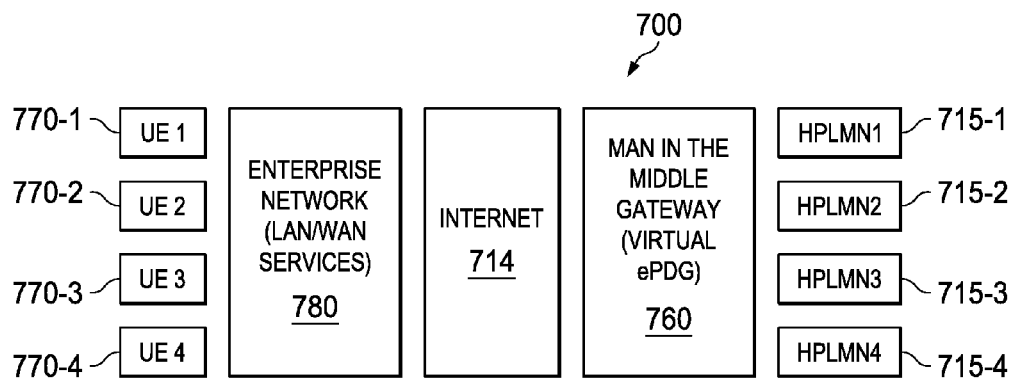
FIG. 7B is another high level block diagram of example components of a Wi-Fi calling system according to at least one embodiment.
Figure 7C:
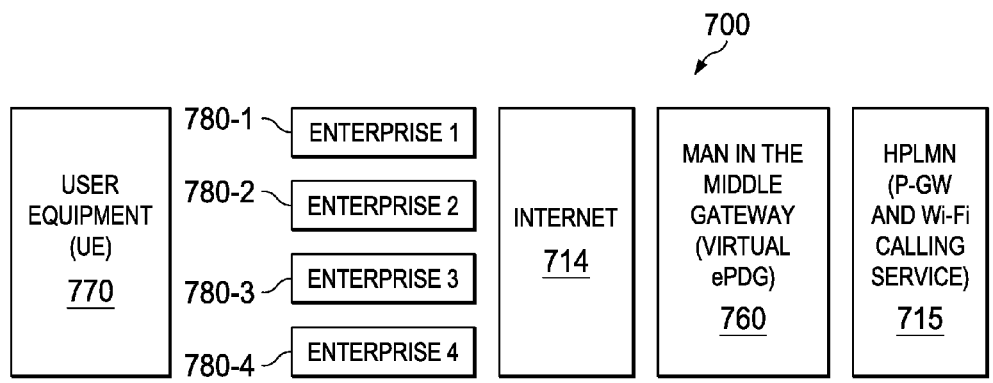
FIG. 7C is another a high level block diagram of example components of a Wi-Fi calling system according to at least one embodiment.

FIGS. 7A-7C are simplified block diagrams of possible components in Wi-Fi calling system 700 for enabling the use of a Wi-Fi calling application on user equipment while protecting a secure tunnel for Wi-Fi calling sessions. As shown in FIG. 7A, Wi-Fi calling system 700 can include user equipment (UE) 770, an enterprise network 780, Internet 714, an authorized man-in-the-middle (MITM) gateway 760, and a Home Public Land Mobile Network (HPLMN) 715. Enterprise network 780 represents a source network that may provide services via a network (e.g., local area network, wireless local area network, virtual local area network, etc.), at least some of which may be accessible by UE 770. In some scenarios, the source network may form part of another network (e.g., campus area network, wide area network, etc.) associated with a common entity.

HPLMN 715 is a mobile wireless network for which a particular service provider is responsible and can include a packet data network gateway (P-GW) and a Wi-Fi calling service to communicate with a Wi-Fi calling application on UE 770. In at least one example, a service provider may be responsible for one or more public land mobile networks (PLMNs) and each UE that subscribes to a particular service provider may be associated with one of the PLMNs of that service provider. The PLMN to which a subscribing UE is associated is referred to as a Home Public Mobile Network (HPLMN) for that UE. In FIG. 7A, HPLMN 715 represents a network associated with a service provider through which UE 770 is a subscribed device for mobile wireless services. UE 770, enterprise network 780, and HPLMN 715 are representative of potentially multiple instances of UEs, enterprise networks, and service providers (or home operators of service providers), respectively, in Wi-Fi calling system 700 with MITM gateway 760. It will also be apparent that, multiple MITM gateways 760 can be provisioned for example, as scaling increases.

Wi-Fi calling applications can be scaled for the enterprise network and for the service providers. To enable the configuration and scaling in Wi-Fi calling system 700, the enterprise has a relationship with the provider of the Wi-Fi roaming exchange, which hosts MITM gateway 760. In at least one embodiment, data intelligence system 40 is configured to perform one or more functions of the Wi-Fi roaming exchange. In addition, the Wi-Fi roaming exchange operator can have relationships with different service providers (e.g., home operators).

In at least one embodiment, the enterprise network is configured to redirect Wi-Fi calling UEs, such as UE 770, towards the roaming exchange. The redirection may be based on Domain Name System (DNS) overwrite or destination IP at Network Address Translation (NAT). For example, an evolved packet data gateway (ePDG) DNS resolution to a service provider may be overwritten to point to the authorized MITM gateway 760. This ensures packet flows are directed to the Wi-Fi roaming exchange. The Wi-Fi roaming exchange can operate as an effective Visited Public Land Mobile Network (VPLMN) for Wi-Fi calling. Thus, the Wi-Fi roaming exchange can get visibility of user flows. The Wi-Fi roaming exchange couples user plane processing to security analytics.

In at least one embodiment, firewall rules of a firewall in enterprise network 780 may be configured to permit an outbound secure tunnel from UE 770 to MITM gateway 760. In at least one embodiment, MITM gateway 760 is an evolved packet data gateway (ePDG), or a virtual ePDG to enable scaling, which is authorized to receive Wi-Fi calling communications sent by UEs from source networks, such as enterprise network 780. The secure tunnel can be an IPSec tunnel, and an Internet Key Exchange (IKEv2) Protocol can be used to establish the tunnel. MITM 760 can terminate the secure tunnel from enterprise network 780, and can receive user plane packets through the secure tunnel from UE 770. MITM 760 can report on visibility of user plane packets to a Security Intelligence Dashboard (shown in FIGS. 8, 9 and 11A-11C). The Security Intelligence Dashboard can report on visibility of the Wi-Fi calling communications to an information security (InfoSec) module of the enterprise network. Call detail records (CDRs) may be generated for MITM service.

FIG. 7B illustrates possible components in Wi-Fi calling system 700, which has been scaled to enable multiple UEs to utilize Wi-Fi calling applications over enterprise network 780. Wi-Fi calling system 700 supports any number of Wi-Fi calling networks without impacting the configuration of enterprise network 780, once enterprise network 780 has been configured to redirect Wi-Fi calls to MITM gateway 760. For example, UEs 770-1, 770-2, 770-3, and 770-4 may be subscribers to service providers of home public land mobile networks (HPLMNs) 715-1, 715-2, 715-3, and 715-4, respectively. The HPLMNs may be associated with the same or different service providers. UEs 770-1, 770-2, 770-3, and 770-4 may initiate Wi-Fi calls via enterprise network 780, which can be routed to the appropriate HPLMNs 715-1, 715-2, 715-3, and 715-4. In other scenarios, multiple UEs may be subscribers to the same service provider and may access the same HPLMN during a Wi-Fi call from enterprise network 780.

FIG. 7C illustrates possible components in Wi-Fi calling system 700, which has been scaled for the service provider to enable a UE to utilize a Wi-Fi calling application over multiple enterprise networks. Wi-Fi calling system 700 supports any number of LAN/WAN source networks without impacting the configuration of the HPLMN associated with the UE. For example, UE 770 may be a subscriber of a particular service provider that runs HPLMN 715, which is the UE's home network. UE 770 may visit multiple enterprises offering Wi-Fi calling over their respective enterprise networks 780-1, 780-2, 780-3, and 780-4. UE 770 may initiate Wi-Fi calls at each of the enterprise networks, and these calls can be routed from the respective enterprise networks to HPLMN 715 via MITM gateway 760.

Figure 8:
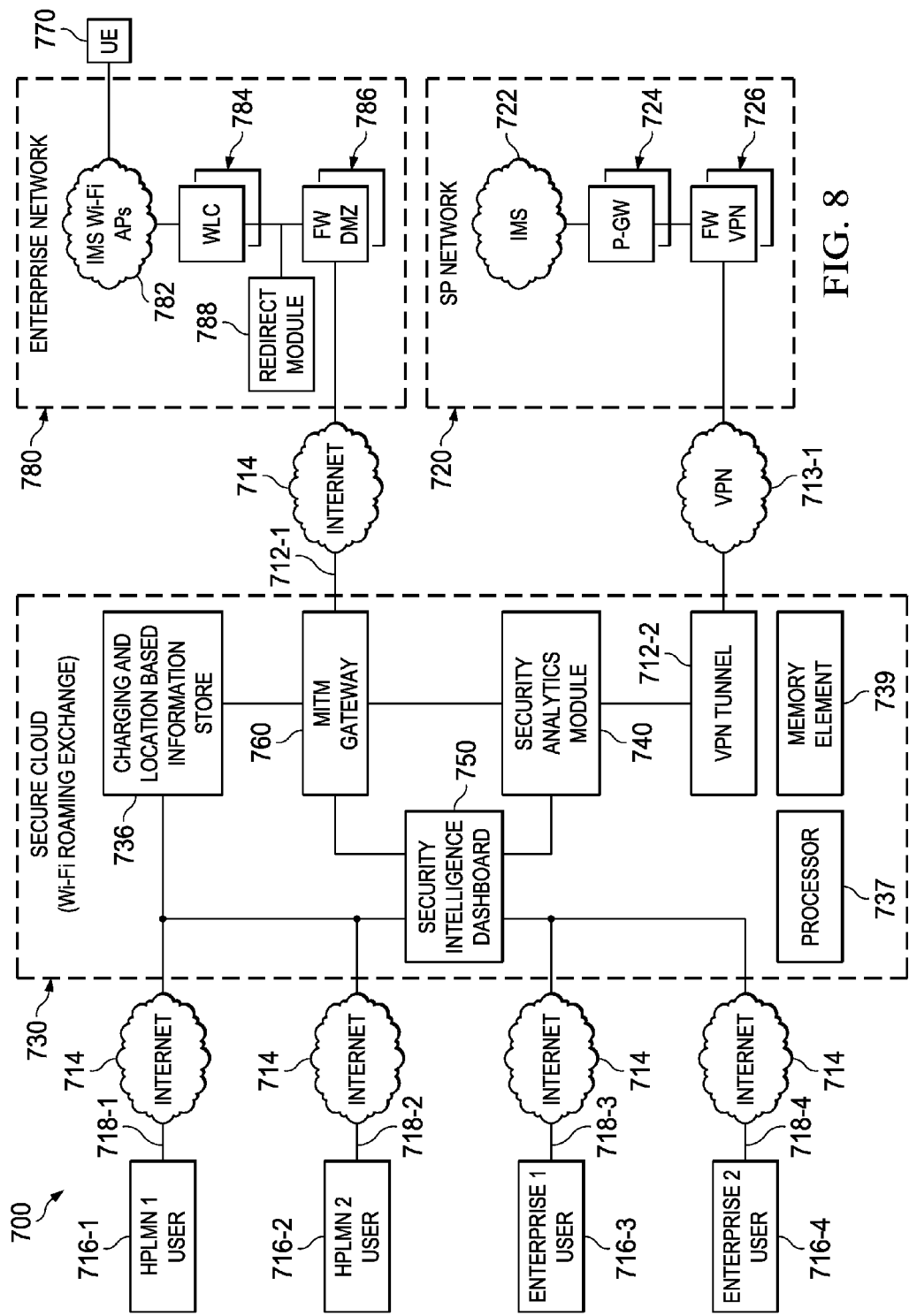
FIG. 8 is a simplified block diagram of a Wi-Fi calling system according to at least one embodiment of the present disclosure.
Figure 9:
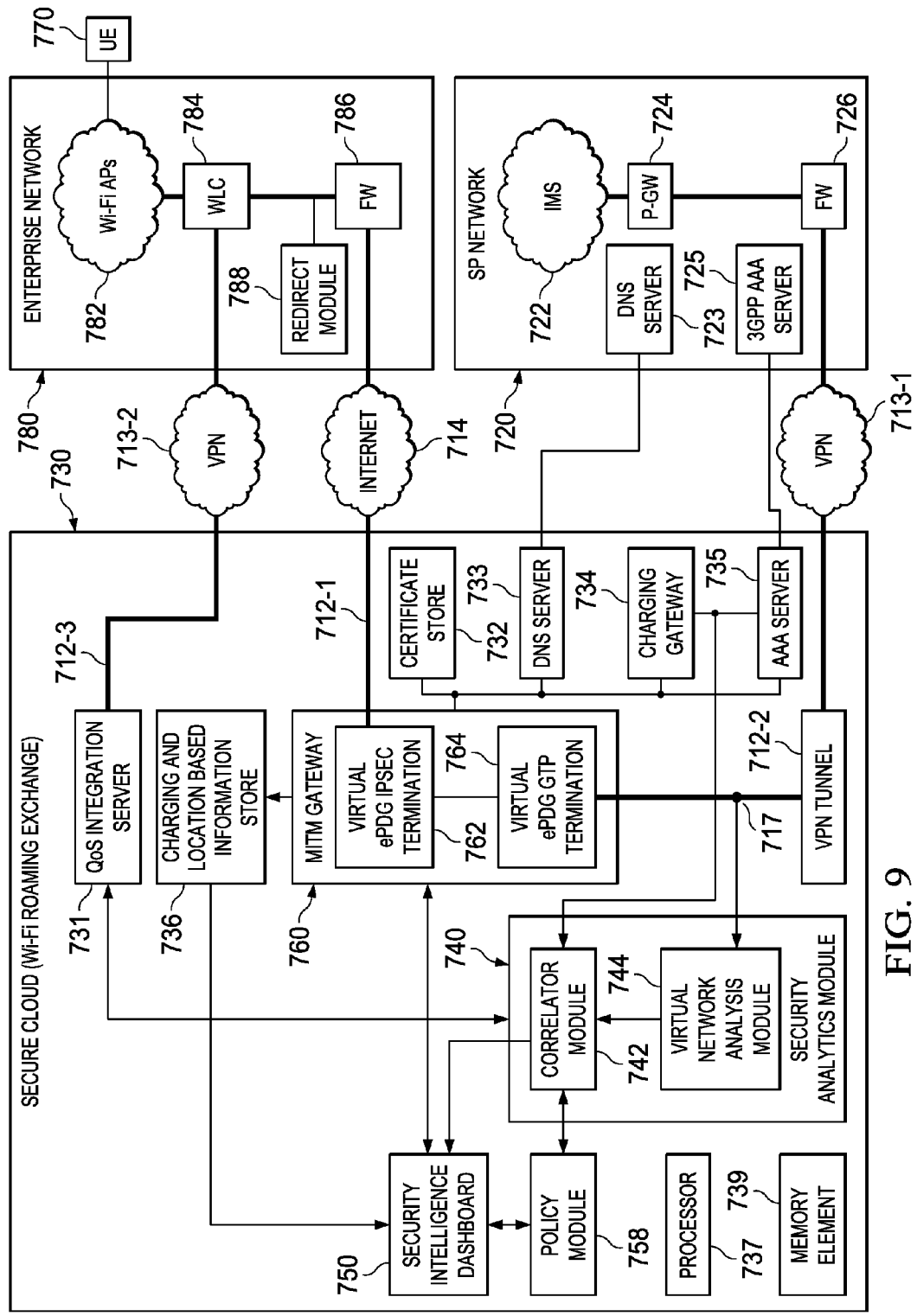
FIG. 9 is a simplified block diagram showing additional possible details of a Wi-Fi calling system according to at least one embodiment of the present disclosure.

Turning to FIG. 8, FIG. 8 is a block diagram that illustrates some potential details of Wi-Fi calling system 700. A Wi-Fi roaming exchange may be embodied in a secure cloud 730. Generally, a Wi-Fi roaming exchange is intended to mean a system that facilitates voice and other media mobile communications initiated by user equipment wirelessly over a source network and routed to a service provider network. For ease of illustration, SP network 720 is depicted in FIG. 9 to represent an example home operator of UE 770. It will be apparent, however, the service provider network 720 could comprise multiple PLMNs, each having unique fully qualified domain names (FQDNs) configured for supporting their Wi-Fi Calling service, to which subscribing UEs could request access. In accordance with embodiments described herein, a Wi-Fi roaming exchange may also provide security analytics of the user flows associated with mobile communications and mitigation of detected threats based on policy.

FIG. 8 offers an example illustration of some possible components in Wi-Fi calling system 700 and communications that may occur when UE 770 initiates a Wi-Fi calling session over Wi-Fi at a source network, such as enterprise network 780. The Wi-Fi roaming exchange may be provisioned in a secure cloud 730 and may comprise one or more network elements (e.g., servers, processors, gateways, etc.) in which MITM gateway 760, a charging and location based information store 736, a security analytics module 740, and a security intelligence dashboard 750, may be provisioned. One or more processors and memory elements, such as a processor 737 and a memory element 739, may also be provided in the one or more network elements of the Wi-Fi roaming exchange.

In at least one embodiment, data intelligence system 40 of communication system 10 can be configured (e.g., with secure cloud 730) to perform one or more functions of the Wi-Fi roaming exchange. In other embodiments, one or more functions of the Wi-Fi roaming exchange may be provisioned in a service provider network such as SP network 720. In yet other embodiments, one or more functions of the Wi-Fi calling exchange may be provisioned in a source network, such as enterprise network 780.

In at least one embodiment, enterprise network 780 may include Wi-Fi access points (APs) 782, a wireless local area network controller (WLC) 784, a firewall (FW) 786, and a redirect module 788. The Wi-Fi APs may be accessible to user equipment, such as UE 770, within a wireless access range of the Wi-Fi APs. The Wi-Fi APs may or may not be configured to require authentication by the UEs when the UEs attempt to establish a wireless connection. UE 770 can include a Wi-Fi calling application that enables UE 770 to initiate a mobile calling session via Wi-Fi access to enterprise network 780. In at least one embodiment, firewall 786 may be a demilitarized zone (DMZ) to provide added security to enterprise network 780. It will be apparent, however, that other types of firewalls may be used depending on particular needs. Firewall 786 can be configured to allow a secure tunnel 712-1 to be established between user equipment, such as UE 770, and MITM 760 in secure cloud 730. In at least one embodiment, secure tunnel 712-1 may be an Internet Protocol (IPSec) tunnel and may be established over Internet 714.

Redirect module 788 in enterprise network 780 may be configured to redirect a Wi-Fi calling communication of a UE to the Wi-Fi roaming exchange. The redirection may be accomplished using any suitable technique to cause packets of the Wi-Fi calling communication to have a destination network address associated with secure cloud 750. In particular, the destination network address may correspond to MITM gateway 760.

An example technique for redirect module 788 includes a Domain Name System (DNS) that is configured to overwrite the destination address of a request to initiate a secure tunnel to an SP network, such as SP network 720, with a network address of the MITM gateway 760 in secure cloud 730. Another example technique for redirect module 788 includes a Network Address Translator (NAT) that is configured to translate the destination address of a request to initiate a secure tunnel to an SP network, such as SP network 720, with a network address of MITM gateway 760 in secure cloud 730. In at least some examples, MITM 760 can include an evolved packet data gateway (ePDG) to which the request for the secure tunnel is redirected by redirect module 788.

In at least one embodiment, SP network 720 can include a firewall (FW) 726 and a packet data network gateway (P-GW) 724 configured to forward Wi-Fi calling communications to an Internet Protocol multimedia subsystem (IMS) 722. IMS 722 represents an integrated network among SP providers that facilitates the use of IP for multiple forms of packet communications (e.g., telephony, electronic mail, Internet, voice over IP, videoconferencing, instant messaging, video on demand, fax, etc.) over wireless or landline. Firewall 726 can be configured to allow a secure tunnel to be established between P-GW 724 and MITM gateway 760 in the Wi-Fi roaming exchange. In at least one embodiment, the secure tunnel may be a virtual private network (VPN) tunnel 712-2 of a virtual private network, such as a General Packet Radio Services Tunneling Protocol (GTP) tunnel. VPN tunnel 12-2 may be established over a VPN which may be provisioned in the Internet, or other suitable network.

In Wi-Fi calling system 700, enterprise users and service provider users can access a security analytics service that may be provided, at least in part, by security dashboard 750. The security analytics service can offer information via a user interface (e.g., graphical user interface (GUI)) derived from security analytics module 740 and/or charging and location based information store 736 for the source network or service provider network associated with the user accessing the information. Examples of such users include, but are not limited to, HPLMN 1 user 716-1 and HPLMN 2 user 716-2, which can be associated with different HPLMNs in the same or different service providers. Other examples of such users include, but are not limited to, enterprise 1 user 716-3 and enterprise 2 user 716-4, which could be associated with different enterprise networks. In at least one embodiment, these users may be required to provide credentials to be authenticated and, if authenticated, the authenticated users may access respective web portals of the security service via secure channels, such as 718-1 through 718-4, over the Internet 714, or another network over which a secure channel can be established.

FIG. 9 is a block diagram that illustrates additional possible details of Wi-Fi calling system 700 in accordance with at least one embodiment. In particular, the Wi-Fi roaming exchange of secure cloud 730 may also include a Quality of Service (QoS) integration server 731, a certificate store 732, a domain name system (DNS) server 733, a charging gateway (CGF) 734, an authentication, authorization, and accounting (AAA) server 735, and a policy module 758. Security analytics module 740 may comprise a correlator module 742 and a virtual network analysis module (vNAM) 744.

In at least one embodiment, MITM gateway 760 may be an evolved packet data gateway (ePDG). Generally, an ePDG can be responsible for internetworking between untrusted, non 3GPP (or other) networks that require secure access (e.g., Wi-Fi, etc.). The ePDG may be virtualized to support multiple service providers and enterprise networks, where multiple UEs can initiate Wi-Fi calling from the same enterprise network. An instance of the ePDG can provide a virtual ePDG IPSec termination point 762 for each IPSec tunnel established between MITM gateway 760 and UE 770 transported over enterprise network 780, and other source networks. The virtualized instance of the ePDG can also provide a virtual ePDG GTP termination point 764 for each GTP tunnel established between MITM gateway 760 and SP network 720, and other SP networks.

In at least one embodiment, when a UE initiates a Wi-Fi calling session, and its packets are redirected to MITM gateway 760, the UE identifies itself to the gateway, and the MITM gateway can respond by identifying itself with a certificate. The certificate can include an identity corresponding to the fully qualified domain name (FQDN) used by the UE to resolve the IP address of its service provider. An FQDN of a service provider (or HPLMN of the service provider) is referred to as a 'realm.' Since the FQDN represents a gateway of a service provider (or HPLMN of the service provider), then a single instance of MITM gateway 760 can be configured to support multiple FQDNs.

In at least one embodiment, the Wi-Fi roaming exchange can be provisioned with a certificate store (e.g., certificate store 732) which contains a plurality of certificates that each correspond to an FQDN of a service provider (or a PLMN of a service provider). In at least one embodiment, the certificate store also includes access point name (APN) operator identifier (01) replacements. It should be noted that SP network 720 in FIGS. 8 and 9 is intended to represent an HPLMN of one or more UEs, such as UE 770, subscribed to the service provider.

In at least one embodiment, MITM gateway 760 is operable to recover the identity of the UE. The UE identity may be obtained from messages exchanged between the UE and the MITM gateway to establish a secure tunnel for a Wi-Fi calling session. In one example, the secure tunnel may be implemented as an Internet Protocol Security (IPSec) tunnel based on Internet Engineering Task Force (IETF) standards to enable secure transmissions of Wi-Fi calling communications between the MITM gateway and the UE. An example protocol specified in an IETF Internet Standard, Request for Comment (RFC) 7296, entitled "Internet Key Exchange (IKEv2) Protocol" by C. Kaufman, et al. (October 2014), provides a mechanism for obtaining keying materials to establish an IPSec tunnel.

In an implementation using IPSec for secure tunnels to transport Wi-Fi calling communications, an identification initiator (IDi) may be included in an IKEv2 authentication request payload and may contain information used by the MITM gateway. The IDi may be configured as user@realm. The MITM gateway can recover the UE identity from the IDi. The MITM gateway can also recover, based on the UE identity, the identity of the service provider serving the UE. Analysis may be via IMSI format, recovering the mobile country code (MCC) and mobile network code (MNC) from the leading digits, or realm analysis. MNC used in combination with MNC uniquely identifies a service provider (or HPLMN). The MITM gateway can identify which certificate of the plurality of stored certificates corresponds to the service provider (or HPLMN) and is able to deliver that certificate to the UE. In this way, a common MITM gateway is able to be effectively shared between multiple service providers and multiple HPLMN operators of the service providers. Thus, the virtualized MITM service can be realized transparently to the UE.

DNS server 733 may be configured to communicate with other DNS servers of SP networks, such as DNS server 723 of SP network 720, to resolve the network address of a service provider's P-GW. In at least one embodiment, MITM gateway 760 may configure a particular FQDN to be used in a DNS request for the P-GW at the SP network. This may be configured based on preferences of the service provider. For example, the service provider may prefer that Wi-Fi calling communications from source networks using a Wi-Fi roaming exchange be routed to a particular instance of P-GW 724. This information may be configurable in the Wi-Fi roaming exchange by an authorized user.

AAA server 735 may be configured to communicate with other AAA servers of SP networks, such as 3GPP AAA server 725 of SP network 720, to authenticate UE 770, when the UE initiates a Wi-Fi calling session from enterprise network 780. This authentication can be performed before the secure tunnel is established between MITM gateway 760 and UE 770. In at least one embodiment, an Extensible Authentication Protocol (EAP) may be used to perform the authentication. However, it will be apparent that any suitable authentication protocol could be used to perform the authentication. The UE can be uniquely identified during the authentication. In addition, other information such as the outer and inner network addresses of the destination (e.g., SP network 720) and the source (e.g., enterprise network 780) of the Wi-Fi calling session can be determined.

In at least one embodiment, the identity of a UE can be used to prevent an IPSec session from being established if the UE was previously determined to be compromised. For example, when the identity of the UE is determined (e.g., during an EAP authentication), a determination can be made as to whether the UE previously exhibited non-conformant traffic when using Wi-Fi calling. In this case, the Wi-Fi roaming exchange can prevent the UE from establishing an IPSec session so that UE 770 is prevented from invoking a Wi-Fi calling service over enterprise network 780. However, UE 770 may not be prevented from using Wi-Fi calling through a public network that has unrestricted access.

In at least one embodiment, charging gateway 734 may be provisioned in the Wi-Fi roaming exchange to generate call detail records (CDRs) for Wi-Fi calling sessions that traverse MITM gateway 760. Information in a CDR can include, but is not limited to, network addresses of the source (e.g., enterprise network 780) and the destination (e.g., SP network 720) of a Wi-Fi calling session, and the IMSI of a UE that initiated the Wi-Fi calling session.

When the authentication of UE 770 is successful, a secure tunnel (e.g., IPSec tunnel 712-1) can be established between MITM gateway 760 and UE 770 via enterprise network 780. In addition, a tunnel may be established between MITM gateway 760 and P-GW 724 of SP network 720. This other tunnel may be established using the general packet radio service (GPRS) tunneling protocol (GTP). In at least one embodiment, the GTP tunnel may be established in a virtual private network (VPN) tunnel 712-2 over a virtual private network (VPN) 713-1 between MITM gateway 760 and P-GW 724.

When the tunnels have been established for a UE, then in at least one embodiment, the user plane is able to integrate with security analytics module 740. In at least one embodiment, packets are embedded in the GTP tunnel between MITM gateway 760 and SP network 720 during a Wi-Fi calling session. Such packets can include Real-Time Transport Protocol (RTP) and Session Initiation Protocol (SIP), for example. These packets can be mirrored to virtual network analysis module 744 during the Wi-Fi calling session. In at least one embodiment, as shown in FIG. 9, the GTP tunnel traffic can be intercepted at 717 (e.g., by a switched port analyzer (SPAN)) and tunneled to vNAM 744. In another embodiment, shown in FIG. 8, vNAM 744 may be placed in-line with the GTP tunnel such that GTP packets may be intercepted, copied and analyzed. In these embodiments, vNAM 744 may be configured to unwrap the packets and analyze them.

In an alternative embodiment, traffic mirroring can be used to mirror the native IP traffic as it is switched between GTP and IPSec, and then use an analytics appliance to evaluate the traffic. In particular, MITM gateway 760 could be configured unwrap the packets received from UE 770 or received from SP network 720, and to send a copy of the unwrapped packets to vNAM 744. Control of traffic mirroring can be via an Authentication, Authorization, and Accounting (AAA) server. The control signaling can further identify a source enterprise (e.g., by IP address at source against preconfigured IP address ranges). The enterprise identity can be included in the mirrored packet (e.g., using a virtual LAN or different mirror header).

The security analytics module is able to detect any anomalous packets being sent over a tunnel to the UE 770. An anomalous packet may indicate the Wi-Fi calling session is a threat. Examples of anomalous packets include, but are not limited to, packets that use a protocol not typically used in a Wi-Fi calling session, packets having an unusual data type, packets using non-standard ports, etc. In at least one embodiment, vNAM 744 can generate analysis information based on the analysis of mirrored traffic it receives. The analysis information can be fed into correlator module 742, which can correlate the analysis information with control plane data associated with the Wi-Fi calling session. A particular example of anomalous packets could include file transfer protocol (FTP) over non-standard ports.

Control plane data may be obtained using any suitable mechanism, based on particular needs and implementations. In one embodiment, authentication, authorization and accounting (AAA) records generated by MITM gateway 760 and signaled to AAA server 735 for a Wi-Fi calling session, may be provided to correlator module 742. In yet another embodiment, call detail (CDR) records generated by MITM gateway 760 and signaled to charging gateway 734 for a Wi-Fi calling session may be provided to correlator module 742. AAA records and CDR records can contain control plane data including, but not necessarily limited to, the IMSI of the UE, the inner IP address of the UE, the outer IP address of the source network (e.g., enterprise network 780), and the IP address of the P-GW of SP network 720. In some implementations, if filters are set on MITM gateway 760, the filters may be reported as separate sub-records.

An enterprise portal of Wi-Fi roaming exchange provides visibility to the Wi-Fi calling sessions established over an enterprise network. This visibility can minimize the security concerns an enterprise may have surrounding IPSec tunnels. The Wi-Fi roaming exchange may also provide visibility to a service provider via a service provider portal. The enterprise and service provider portals are collectively represented by security intelligence dashboard 750 (also referred to herein as 'security dashboard').

The security dashboard can give an analytics view of enterprise-specific information to each enterprise that enables Wi-Fi calling sessions through the Wi-Fi roaming exchange. In at least one embodiment, a particular enterprise can see the analytics for all of the Wi-Fi calling sessions that are made (or attempted) through its enterprise network. These analytics for a particular time can include one or more UEs and one or more service providers, depending on the calls made during the particular time. Thus, IPSec is more likely to be supported across an enterprise LAN. It will be apparent that the security dashboard can give an analytics view of any source network that enables Wi-Fi calling sessions through the Wi-Fi roaming exchange.

Security dashboard 750 can also give an analytics view of service provider-specific information to service providers that allow the Wi-Fi roaming exchange to configure and use their certificates to enable Wi-Fi calling sessions to be established by their subscriber UEs through the Wi-Fi roaming exchange. In at least one embodiment, a particular service provider can see the analytics for all of the Wi-Fi calling sessions that are made (or attempted) from their subscriber UEs via Wi-Fi of source networks that redirect those Wi-Fi calling communications to the Wi-Fi roaming exchange. These analytics for a particular time can include one or more UEs and one or more source networks such as enterprise network 720, depending on the calls made during the particular time.

In FIG. 9, policy module 758 may be leveraged by security dashboard 750 and/or security analytics module 740. After network traffic has been analyzed and correlated with control plane data (e.g., by security analytics module 740), a determination may be made as to whether the network traffic violates any policies. Such policies may be specific to source networks (e.g., enterprise network 720), service provider networks (e.g., SP network 720), or to any suitable combination of such networks. For example, vNAM 744 may determine the network traffic is indicative of an attack, and correlator module 744 may identify a UE associated with the network traffic. A determination may be made that the particular attack that was identified violates a policy of the enterprise and, therefore, an action can be performed on the Wi-Fi calling session based on the appropriate policy. Actions that may be performed could include, but are not limited to, blocking a current session, terminating a current session, quarantining user flows of a current session, and/or blocking future sessions initiated by the same UE associated with the identified attack. In at least some scenarios, security dashboard 750 may be configured to allow an authorized agent (e.g., human agent or software agent) of the enterprise or service provider to take corrective in real time by issuing appropriate instructions via the dashboard, for example.

Various methods may be used to terminate a Wi-Fi calling session or an attempt to establish a Wi-Fi calling session. In one example, an attempt to establish a Wi-Fi calling session may be terminated by ending the exchange with AAA server 735 in the Wi-Fi roaming exchange, if it has not completed. In another example, for a particular Wi-Fi calling session that is identified as a threat, information may be passed to SP network 720, a corresponding access request or other packet associated with the Wi-Fi calling session can be tagged, and the SP network can deny access to the tagged packets. It should be noted that these are illustrative of possible techniques that may be implemented, and that any other suitable techniques may be used.

In at least one embodiment, the Wi-Fi roaming exchange may also include Quality of Service (QoS) integration server 731 to prioritize Wi-Fi calling traffic traversing the enterprise network. Enterprise network 780 only sees a secure tunnel without being able to determine the contents of the tunnel. QoS integration server 731 can receive information from security analytics module 740 when network traffic has been evaluated and determined to be valid Wi-Fi calling communications. For example, the vNAM may expect to see Real-Time Transport (RTP) packets and/or Session Initiation Protocol (SIP) packets for legitimate Wi-Fi calling traffic from UE 770. Thus, if these packets are identified by vNAM 744, such information can be fed to QoS integration server 731 to indicate the Wi-Fi calling session is not deemed a threat.

In response to receiving information indicating that a particular Wi-Fi calling session is not a threat, QoS integration server 731 can send a request to enterprise network to prioritize network traffic of the Wi-Fi calling session. The request may be sent via a secure signaling link (e.g., secure tunnel of VPN 713-2 or any other suitable technique that enables a secure communication between two domains) established between QoS integration server 731 and enterprise network 780. In at least one embodiment, this secure tunnel may be established before information is received by QoS integration server 731 indicating the Wi-Fi calling session is not a threat. In other embodiments, this secure tunnel may be established in response to receiving a notification that the Wi-Fi calling session is not a threat. In one particular implementation, the secure tunnel may be established between QoS integration server 731 and a controller (not shown) in enterprise network 780, which can forward control traffic from QoS integration server 731 to WLC 784.

In at least one embodiment, the security analytics module may be security analytics module 105 of data intelligence system 40. The display engine of data intelligence system 40 may be leveraged by, for example, security dashboard 750, to provide security analytics information to the enterprise for Wi-Fi calls made when end users are on the enterprise premises. Although embodiments have been discussed in relation to a Wi-Fi calling service and data intelligence system 40 herein, it will be apparent that any service of an enterprise network that triggers network security concerns due to concealing traffic within a secure tunnel could also benefit from the security concepts disclosed herein.

It should also be apparent that various alternative implementations may be applied to the broad concepts described herein. In one particular alternative implementation, MITM gateway 760 and VPN tunnel 712-2 can be provisioned in enterprise network 780. Thus, secure tunnel (e.g., IPSec) 712-1 can be established and maintained in the enterprise network. In at least one embodiment, various other components (e.g., security analytics module 740, security dashboard 750, QoS integration server 731, etc.) could remain in the Wi-Fi roaming exchange of secure cloud 730. In this example, each MITM gateway can be dedicated to Wi-Fi calling sessions from a particular source network where that gateway is provisioned.

Figure 10:
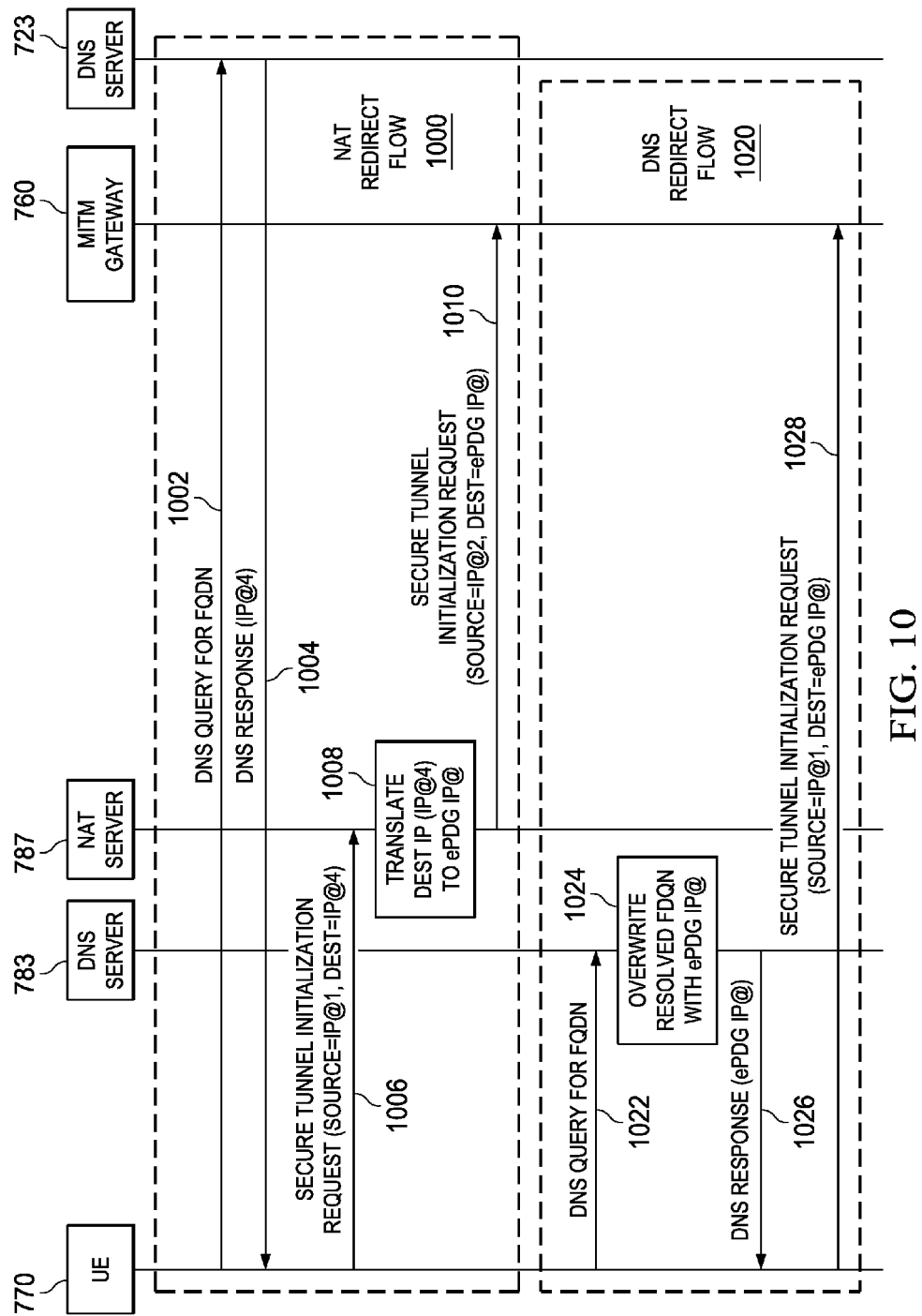
FIG. 10 is a simplified interaction diagram illustrating possible communications between certain components of a Wi-Fi calling system according to at least one embodiment.

Turning to FIGS. 10 and 11A-11C, simplified interaction diagrams illustrate at least some communications that may occur in accordance with embodiments described herein. FIG. 10 illustrates alternative possible embodiments of redirect module 788 for redirecting Wi-Fi calling communications to the Wi-Fi roaming exchange when UE 770 initiates a Wi-Fi call using a Wi-Fi calling application within a Wi-Fi range of enterprise network 780. FIG. 10 includes interactions involving UE 770, a DNS server 783 of enterprise network 780, a network address translator (NAT) server 787 of enterprise network 780, MITM gateway 760 of the Wi-Fi roaming exchange, and DNS server 723 of SP network 720.

One embodiment of redirect module 788 includes a NAT redirect flow 1000 that uses network address translation to redirect the communications from UE 770 to MITM 760, rather than being routed directly to SP network 720. In the NAT redirect flow, when a Wi-Fi call is initiated by UE 770 at the enterprise network, a DNS query is sent at 1002. The DNS query is sent to resolve a fully qualified domain name (FQDN) of an SP network from which the UE is authorized to obtain mobile wireless services. In at least one scenario, the UE could be authorized to obtain mobile wireless services from an SP network based on a subscription. In this example, the FQDN corresponds to SP network 720. The DNS query may be sent to DNS server 783 in enterprise network 780 first, and then possibly routed to DNS server 725 of SP network 720. At 1004, a DNS response is sent to UE 770 containing the IP address of SP network 720. In particular, the outer IP address of an ePDG may be provided in the DNS response. In this example scenario, the outer IP address that is returned to UE 770 is IP@4.

In at least one embodiment, Internet Key Exchange Protocol Version 2 may be used to establish the secure tunnels needed by the Wi-Fi calling application on the UE to transport Wi-Fi calling communications from UE 770 to SP network 720. For ease of illustration herein, protocol messages in the interaction flows may be described with reference to IKEv2 protocol. It will be apparent, however, that any other suitable protocols may be used and particular protocol communications may be modified accordingly to achieve the same result.

At 1006, UE 770 can send a request (e.g., IKE_SA_INIT) to initialize a secure tunnel to transport Wi-Fi calling communications. The request can include a destination that is the IP address returned in the DNS response, and a source that is the inner source IP address of enterprise network 780. In this example, the inner source IP address of enterprise network 780 is IP@1. At 1008, NAT server 787 can translate the destination address (e.g., IP@4) with the IP address of MITM gateway 760. In this example, the IP address of the MITM gateway is referred to as 'ePDG IP@'. The NAT server can also translate the inner source address to an outer source IP address of the enterprise network. In this example, the outer source IP address is IP@2.

At 1010, the NAT server can send the secure tunnel initialization request using new source and destination addresses based on the network address translation. In this example, the outer source IP address of the enterprise network is IP@2. The destination IP address of the request is ePDG IP@ due to the pre-configured translation for Wi-Fi calling communications. In at least one embodiment, each Wi-Fi calling communication that is sent by the UE can be translated by NAT server 787 to redirect the communication to the Wi-Fi roaming exchange.

Another embodiment of redirect module 788 includes a DNS redirect flow 1020 that uses domain name system (DNS) redirection to redirect the communications from UE 770 to MITM 760, rather than being routed directly to SP network 720. In the DNS redirect flow, when a Wi-Fi call is initiated by UE 770 at the enterprise network, a DNS query is sent at 1022. The DNS query may be the same as previously described with reference to 1002. The DNS query may be sent to DNS server 783 in enterprise network 780. At 1024, DNS server 783 is configured to overwrite the resolved FDQN with the network address of MITM gateway 760. In this scenario, the address of the MITM gateway is ePDG IP@. At 1026, a DNS response is sent to UE 770 containing the IP address of MITM gateway 760.

At 1028, UE 770 can send a request (e.g., IKE_SA_INIT) to initialize a secure tunnel to transport Wi-Fi calling communications. The request can include the IP address returned in the DNS response as a destination address, and the inner IP address of enterprise network 780 as a source address (or an outer IP address as a source address if network address translation is used). In this scenario, the source address is IP@1 and the destination address is ePDG IP@, due to the DNS overwrite. In at least one embodiment, once the FDQN is resolved by DNS server 785, the UE may continue to use the IP address returned by the DNS response as a destination address of its Wi-Fi calling communications, without repeated DNS queries.

Figure 11B:
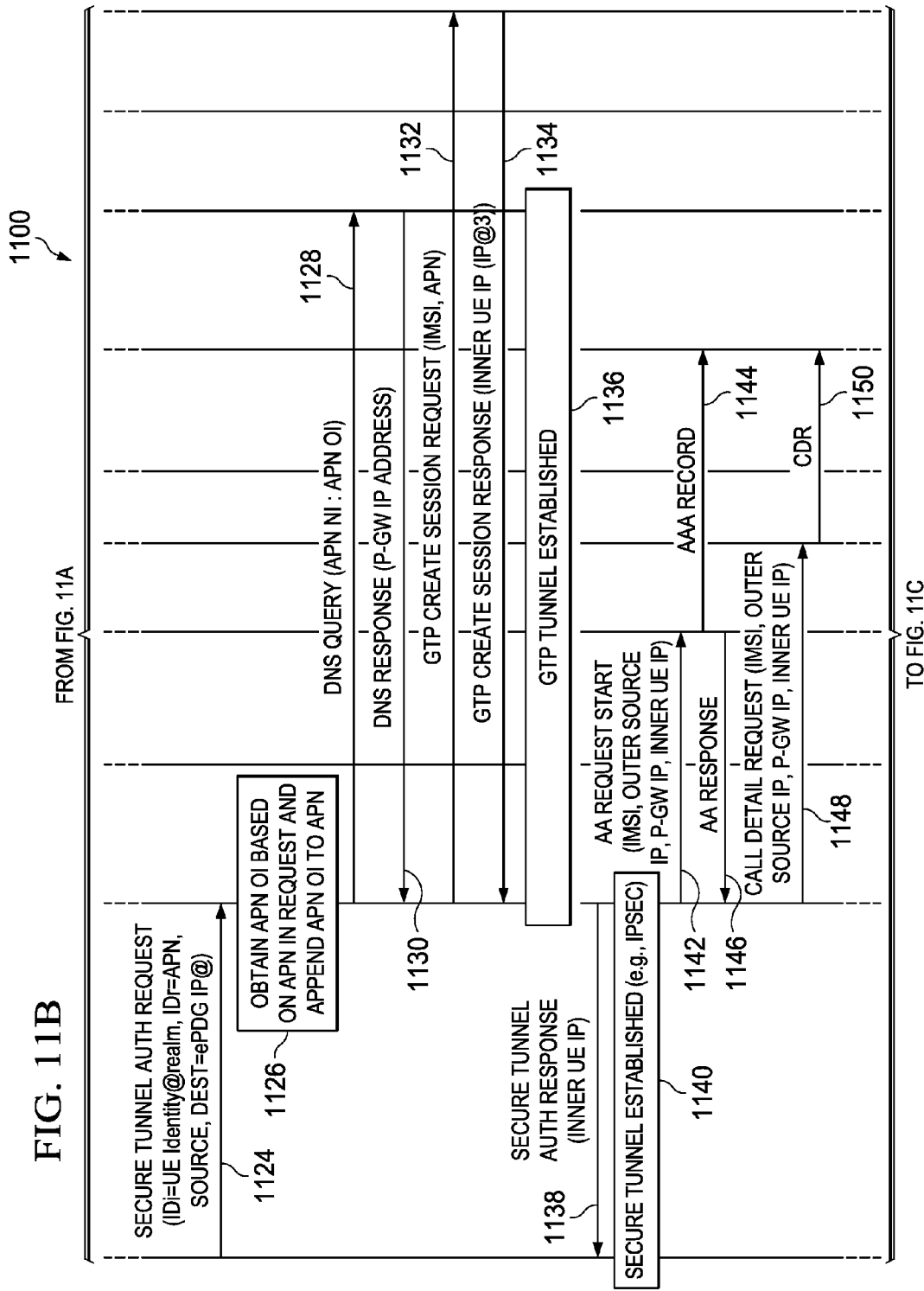
Figure 11C:
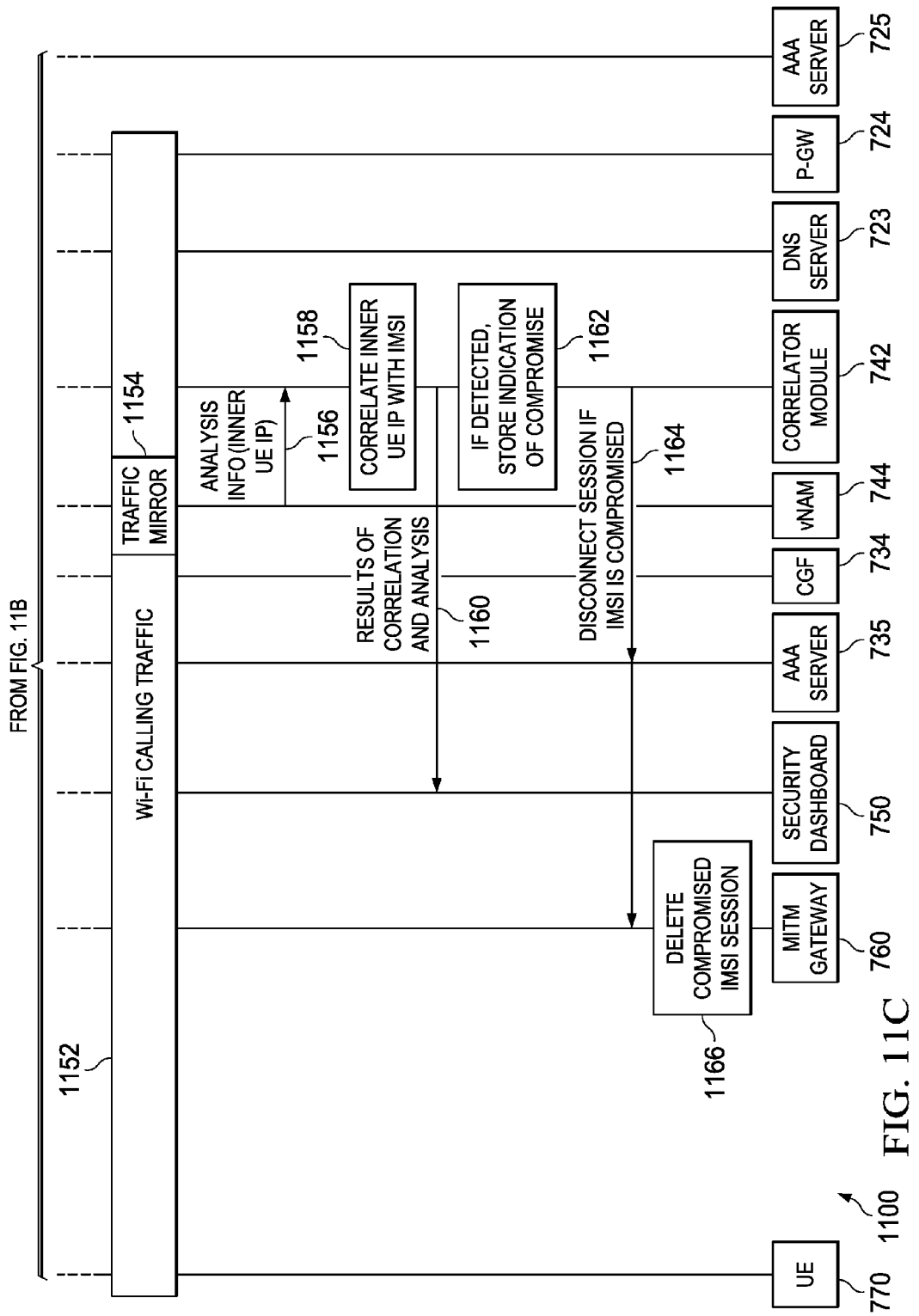

FIGS. 11A-11C illustrate an interaction flow 1100 for establishing a Wi-Fi calling session by UE 770 from enterprise network 780 according to at least on embodiment described herein. FIGS. 11A-11C include interactions involving a) UE 770 at enterprise network 780, b) MITM gateway 760, security dashboard 750, AAA server 735, charging gateway (CGF) 734, vNAM 744, and correlator module 742 of the Wi-Fi roaming exchange, and 3) DNS server 723, P-GW 724, and AAA server 725 of SP network 720. It should be noted that interaction flow 1100 can occur after the secure tunnel initialization request and response has been performed. Either a DNS overwrite or a destination IP NAT translation as described with reference to FIG. 10, or another suitable redirect technique, may be performed prior to interaction flow 1100.

At 1102, a secure tunnel authorization request (e.g., IKE_AUTH) may be sent from UE 770 to MITM gateway 760. In at least one embodiment, the request can include a destination address (e.g., ePDG IP@), source address (e.g., IP@1 or 2, depending on whether NAT is used), an identification-initiator (IDi), and an identification-responder (IDr). The IDi can be in a format of 'UE identity@realm'. The IDr can be an access point name (APN) with an operator portion and a network portion. At 1104, MITM gateway 760 can identify the service provider associated with the UE based on the realm in the IDi. At 1106, MITM gateway can identify a certificate for the identified service provider. In at least one embodiment, the certificate may be obtained from certificate store 732, which may be preconfigured with certificates and service provider identifications.

At 1108, MITM gateway 760 can attempt to authenticate the UE. In at least one embodiment, AAA servers 735 and 725 may be used to perform the authentication, based on an extensible authentication protocol (EAP). MITM gateway 760 can send an authentication and authorization (AA) request to AAA server 735. The AA request may include EAP parameters and the International Mobile Subscriber Identity (IMSI) of the UE.

In at least one embodiment, the AA request may be forwarded to correlator module 742. At 1110, the correlator module can determine whether the IMSI is associated with a UE that has been compromised. This determination may be made based on the prior history of the UE. For example, if the UE previously exhibited non-conformant traffic over a Wi-Fi calling session, or violated a policy associated with the enterprise network, then information may have been previously stored that indicates the IMSI is associated with a compromised UE. If a determination is made that the UE (e.g., based on its IMSI) is compromised, then the AAA exchange may be terminated and a secure tunnel is not established for the Wi-Fi calling session requested by the UE. Thus, UE 770 is prevented establishing a Wi-Fi calling session via Wi-Fi of enterprise network 780. The UE, however, may be able to make a Wi-Fi call by accessing an unsecured network via Wi-Fi or by accessing SP network 720 via the available mobile wireless technologies.

If the IMSI is determined not to be associated with a compromised UE, then the AA request may be forwarded, at 1112, to AAA server 725 in SP network 720. At 1114, an AA response may be sent to AAA server 735 and then forwarded to MITM gateway 760. At 1116, MITM gateway 760 can send a secure tunnel authorization response to UE 770. The authorization response may include the certificate identified for the service provider and an EAP message.

The EAP exchange may continue at 1118, between the AAA servers of the Wi-Fi roaming exchange and the SP network. In at least one embodiment, the EAP Authentication and Key Agreement (EAP-AKA) method may be used. EAP-AKA is an authentication for Wi-Fi users based on information retrieved from Home Location Register (HLR) and Home Subscriber Server (HSS). The HLR contains subscriber data and information related to call routing. The HSS is a database for a given mobile wireless subscriber containing subscription-related information. In EAP-AKA authentication, challenge-response mechanisms and symmetric cryptography may be used.

If the EAP exchange is successful, at 1120, the AAA server in SP network 720 can send an AA answer to the AAA server in the Wi-Fi roaming exchange. The AA answer may contain an indication that the EAP exchange was a success. The AAA server in the Wi-Fi roaming exchange can forward the AA answer to MITM gateway 760. At 1122, the MITM gateway can send, to the UE, a response to the secure tunnel authorization request. The response can indicate that the EAP exchange was a success and therefore, the UE has been authenticated.

In FIG. 11B, at 1124, UE 770 can send another secure tunnel authorization request to MITM gateway 760 to determine addresses to be used in the Wi-Fi calling session. The authorization request can include the IDr, which can be an access point name (APN) associated with SP network 720. An APN can include an operator identity (OI) and network identity (NI). The APN OI can define the service provider's packet domain network in which the gateway GPRS support node (GGSN) is located. The APN NI can define the external network to which the GGSN is connected.

At 1126, MITM gateway 760 can obtain the APN operator identifier (APN OI) replacement based on the APN in the authorization request. The APN NI of the APN may be used to identify an APN OI replacement. In at least one implementation, the APN OI replacement for SP network 720 is stored in certificate store 732. When the APN OI replacement is identified, it may be appended to the APN. For illustration purposes, an example APN may be 'epc.mnc15.mcc235.3gppnetwork.org', where 'epc' is the APN NI and 'mnc15.mcc235.3gppnetwork.org' is the APN OI replacement that has been appended to the APN NI.

At 1128, a DNS query can be sent by the MITM gateway to DNS server 723 in the SP network. The DNS query can contain the APN, including both the network identifier and the operator identifier. At 1130, a DNS response is sent from DNS server 723 to the MITM gateway. The DNS response can contain an IP address for P-GW 724 in the SP network. At 1132, the MITM gateway can send a GTP create session request to P-GW 724 in order to create a secure tunnel for the Wi-Fi call between the Wi-Fi roaming exchange and the SP network. The GTP create session request is sent to the IP address, received in the response at 1130, to reach the P-GW in SP network 720. The GTP create session request can include the IMSI of UE 770 and the APN. At 1134, P-GW 724 can send a response to the MITM gateway. If the response is sent to establish the GTP tunnel, then it can include an inner IP address allocated by P-GW 724 to UE 770, which can be used for sending traffic via the GTP tunnel. In this example, the inner IP address is IP@3. The GTP tunnel is established at 1136.

At 1138, MITM gateway 760 can send a secure tunnel authorization response to UE 770. The authorization response can include a configuration payload including, but not limited to, the inner IP address allocated by P-GW 724 in SP network 720 to UE 770. At 1140, a secure tunnel (e.g., IPSec tunnel) can be established between UE 770 and the MITM gateway 760.

When the secure tunnels are established, control plane data may be generated and provided to correlator module 742. The control plane data may be generated in the form of CDR and/or AAA records. At 1142, an AA request start message may be sent from MITM gateway 760 to AAA server 735 in the Wi-Fi roaming exchange. The request can include, but is not limited to, the IMSI, the IP address of P-GW 724, the inner IP address of UE 770, and the outer source IP address of tunnel of UE 770. AAA server 735 can generate an AAA record with this information and, at 1144, can send the AAA record to correlator module 742. At 1146, AAA server 735 may send a response to the MITM gateway.

At 1148, a call detail request may be sent from MITM gateway 760 to charging gateway (CGF) 734 in the Wi-Fi roaming exchange. The request can include, but is not limited to, the IMSI, the IP address of P-GW 724, and the inner IP address of UE 770, and the outer source IP address of tunnel of UE 770. Charging server 734 can generate a call detail record (CDR) with this information and, at 1150, can send the CDR to correlator module 742.

As shown in FIG. 11C, at 1152, network traffic of the Wi-Fi calling session can be transmitted between UE 770 and P-GW 724 of the SP network, via secure tunnels through the Wi-Fi roaming exchange. A traffic mirror 1154, embodiments of which were previously described herein, enables the tunneled packets to be intercepted and copied to virtual network analysis module (vNAM) 744 in the Wi-Fi roaming exchange for analysis. The flow from 1156 through 1166 is illustrative of analysis and actions that may be performed on when a tunneled packet is sent to vNAM 744.

When the vNAM receives a Wi-Fi calling packet, the packet may be unwrapped, and its contents may be analyzed. At 1156, analysis information may be sent to correlator module 742. In addition, the inner IP address of UE 770 that is included in the packet may also be provided to correlator module. At 1158, the correlator module can correlate the inner IP address with the IMSI of UE 770. Thus, the IMSI of UE 770 can be associated with the Wi-Fi calling packet. Policies may be evaluated to determine whether the Wi-Fi calling packet has violated any policies and/or what action to perform if a violation has occurred.

At 1160, results of the correlation and analysis may be provided to security dashboard 750. Security dashboard may provide the analysis information to authenticated users associated with either the enterprise network 780 or SP network 720, via a user interface. The information relevant to Wi-Fi calling sessions from a particular source network may be made available to authorized users associated with the source (e.g., enterprise). Information relevant to Wi-Fi calling sessions via a particular service provider may be made available to authorized users associated with the service provider.

If the Wi-Fi calling packet is determined to violate a policy, then at 1162, the correlator module may record an indication of the possible (or actual) compromised state of the UE. This recording may be based on the IMSI of the UE. In at least one example, if the UE has been determined to be in a compromised state, the pertinent policy may require the Wi-Fi calling session to be terminated. In this case, at 1164, the correlator module 744 can send an instruction to terminate the Wi-Fi calling session. In at least one embodiment, at 1164, an instruction can be sent to AAA server 735, which can provide appropriate instructions to MITM gateway 760. At 1166, the compromised IMSI session can be deleted. It will be apparent, however, that other actions additional or alternative actions may be taken. For example, flows of the Wi-Fi calling session could be quarantined, an alert could be sent to an administrator, etc.

Figure 12:
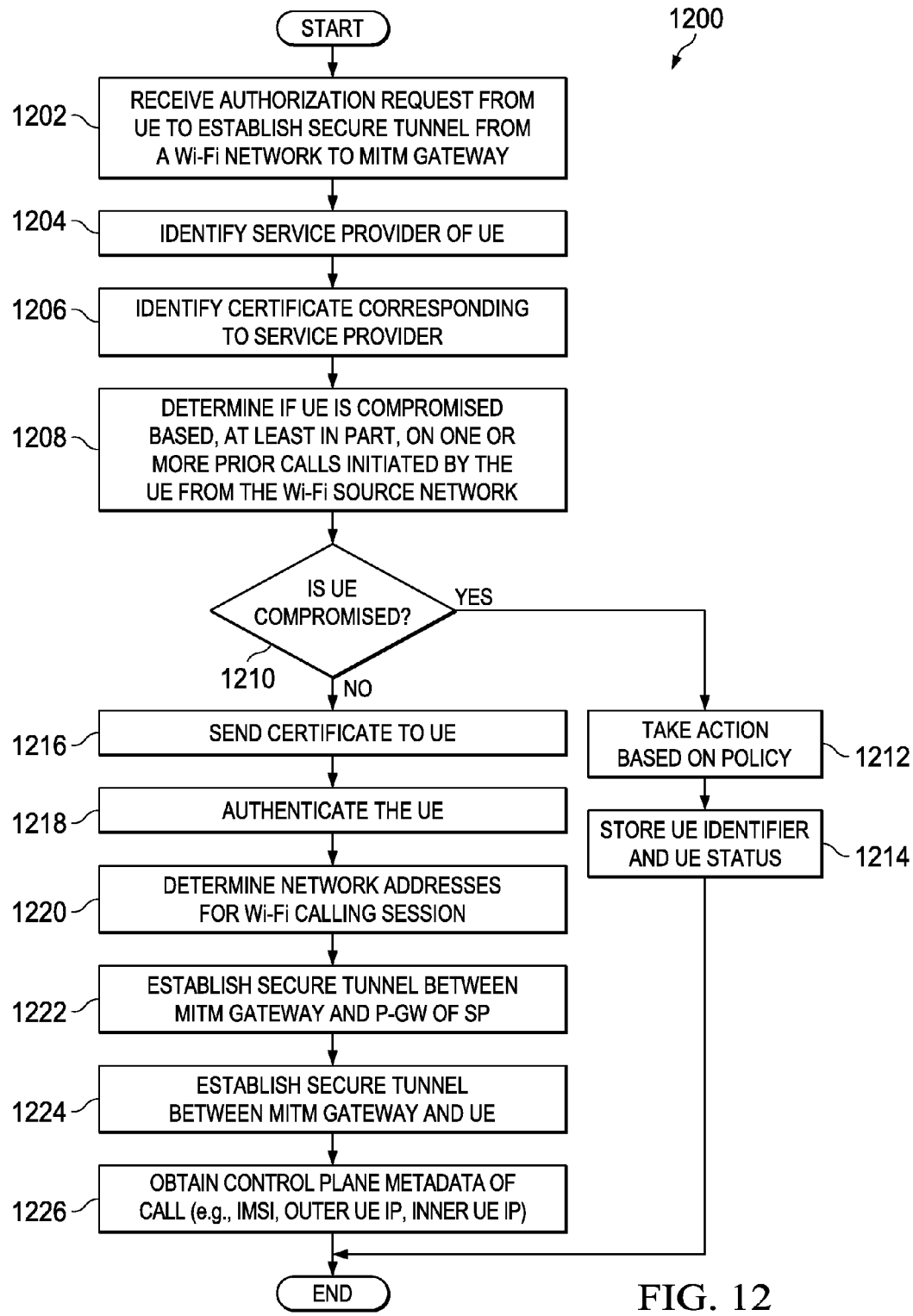
FIG. 12 is a simplified flow diagram illustrating possible operations associated with a Wi-Fi calling system according to at least one embodiment.

Turning to FIG. 12, FIG. 12 is a simplified flow diagram 1200 that illustrates possible operations that may be performed in at least one embodiment of Wi-Fi calling system 700. One or more sets of operations may correspond to activities of FIG. 12. In at least one embodiment, the Wi-Fi roaming exchange in secure cloud 730 may comprise means such as one or more processors (e.g., processor 737), for performing the operations. In one example, at least some of the operations may be performed by MITM gateway 760 and security analysis module 740 when executed by one or more processors such as processor 737.

At 1202, an authorization request may be received from a UE to establish a secure tunnel from a source network (e.g., enterprise network 780) to an MITM gateway (e.g., MITM gateway 760) in a Wi-Fi roaming exchange. At 1204, the service provider of the UE can be identified. In at least one embodiment, the service provider is identified based on a network access identifier, such as a realm, that is provided in the authorization request. At 1206, a certificate corresponding to the identified service provider is identified. In one example, certificates may be preconfigured and stored in, for example, a certificate store, such as certificate store 732 in the Wi-Fi roaming exchange of secure cloud 730.

At 1208, a determination is made as to whether the UE is compromised. This determination can be made based, at least in part, on one or more prior calls initiated by the UE from the Wi-Fi source network. For example, when a determination is made by the Wi-Fi roaming exchange that a UE is compromised, this information may be stored (e.g., in memory element 739) to indicate the UE state (e.g., compromised, possibly compromised, etc.) for later access should the UE attempt to make another Wi-Fi call from the same Wi-Fi source network. Thus, if the stored UE state indicates that the UE at is compromised as evaluated at 1210, then at 1212, an action may be taken based on policy. In one example, the policy may require the session initiation process to be terminated, so that secure tunnels are never established for a Wi-Fi calling session with the UE. In other implementations, other actions may be taken (e.g., quarantine, alert to administrator, etc.). Moreover, different states of the UE may have different policies that require different actions to be taken. At 1214, the UE identifier (e.g., IMSI) and UE state may be stored for later access, if needed.

If it is determined at 1210 that the UE is not compromised, then at 1216, the identified certificate associated with the service provider of the UE is sent to the UE. At 1218, the UE can be authenticated. In one example, an EAP-AKA exchange can be performed between the UE and an AAA server in the SP network to which the UE is attempting to establish a Wi-Fi calling session. Once the UE authentication is successful, at 1220, the network addresses to be used for the Wi-Fi calling session are determined. This can be the network addresses, outer IP of a UE 770 and inner IP of UE 770, for the SP network to which the UE is attempting to establish a Wi-Fi calling session.

If the UE authentication is successful and the network addresses for the P-GW are obtained, then at 1222, a secure tunnel can be established between the Wi-Fi roaming exchange and the SP network. In one example, the secure tunnel may be a GTP tunnel from the MITM gateway in the Wi-Fi roaming exchange to the P-GW in the SP network. At 1224, a secure tunnel can be established between the Wi-Fi roaming exchange and the UE. In particular, the secure tunnel may be an IPSec tunnel from the MITM gateway in the Wi-Fi roaming exchange to the UE via the Wi-Fi source network.

When the secure tunnels have been established, at 1226, control plane metadata may be generated and provided to a security analytics module in the Wi-Fi roaming exchange. The control plane metadata can be generated in AAA records by an AAA server or in CDRs by a charging gateway. The control plane metadata can include, but is not limited to, the IMSI of the UE, UE inner and outer IP addresses. The P-GW IP address may also be included.

Figure 13A:
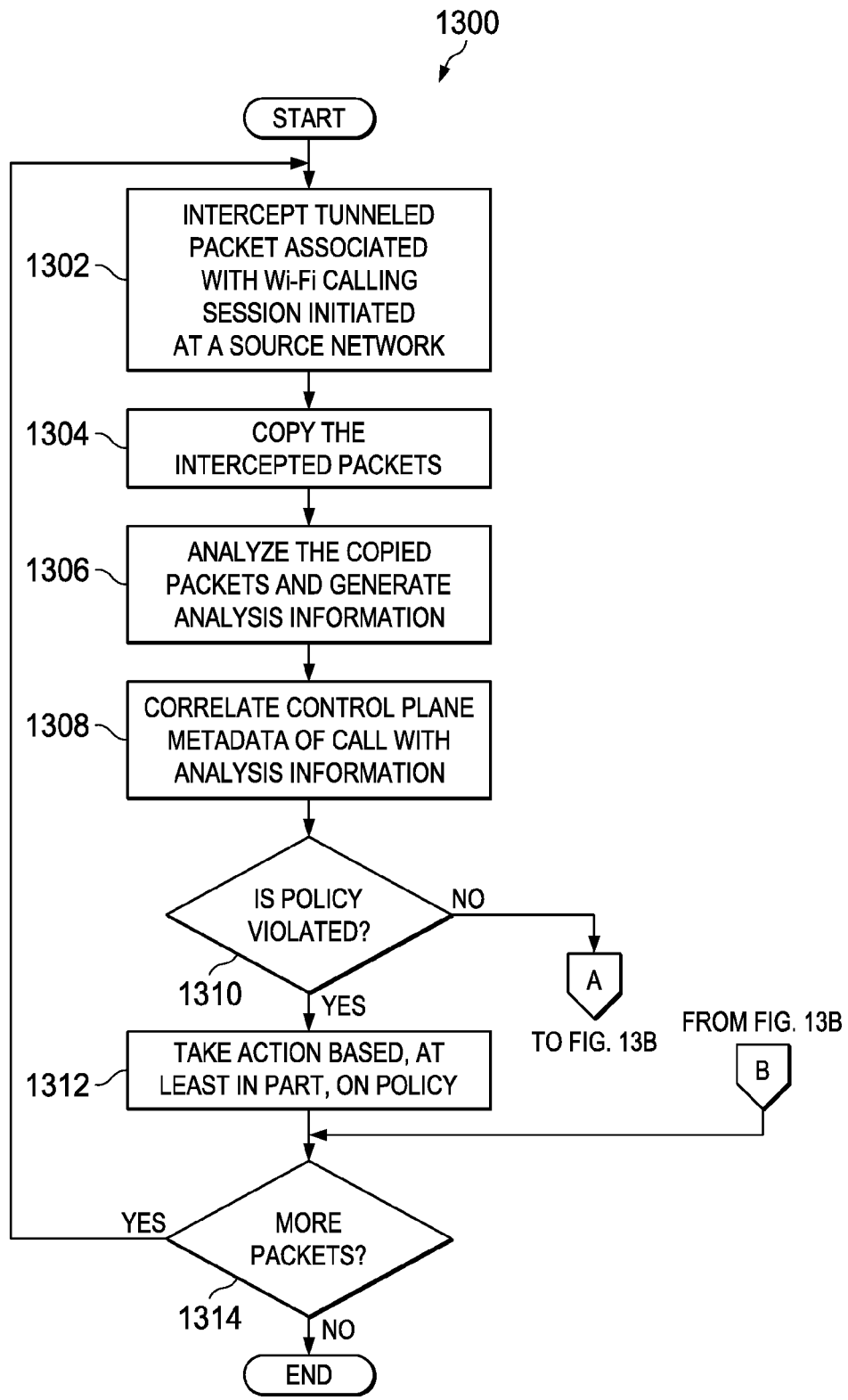
FIG. 13A is a simplified flow diagram illustrating further possible operations associated with a Wi-Fi calling system according to at least one embodiment.
Figure 13B:
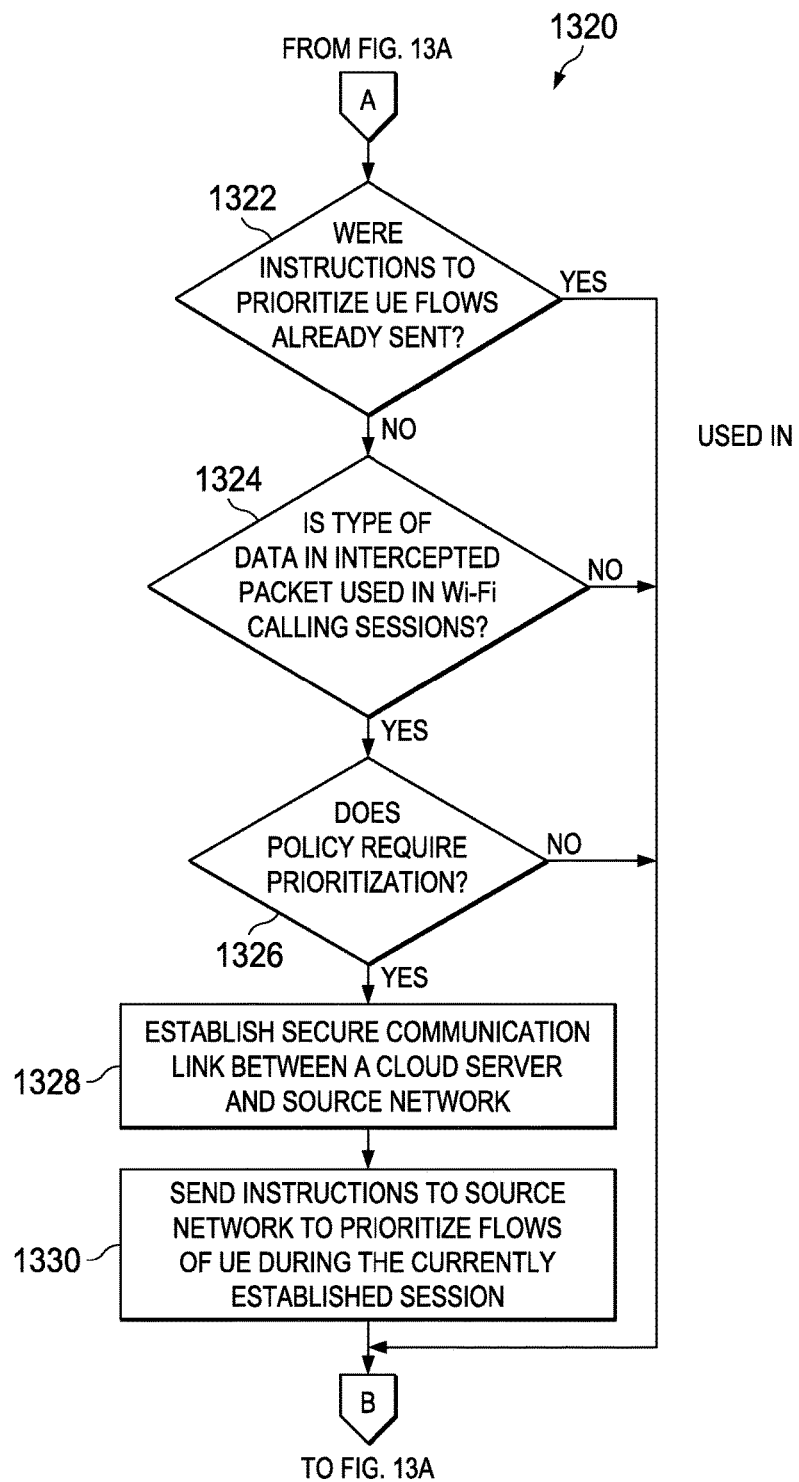
FIG. 13B is a simplified flow diagram illustrating yet further possible operations associated with a Wi-Fi calling system according to at least one embodiment.

FIGS. 13A and 13B are simplified flow diagrams 1300 and 1320, respectively that illustrate further possible operations that may be performed in at least one embodiment of Wi-Fi calling system 700. One or more sets of operations may correspond to activities of FIGS. 13A and 13B. In at least one embodiment, the Wi-Fi roaming exchange in secure cloud 730 may comprise means such as one or more processors (e.g., processor 737), for performing the operations. In one example, at least some of the operations may be performed by MITM gateway 760, security analysis module 740, and QoS integration server 731 when executed by one or more processors such as processor 737. Flow diagrams 1300 and 1320 show operations that may be performed after a Wi-Fi calling session has been established between a UE and its SP network, via a Wi-Fi roaming exchange, where the UE initiated the session over Wi-Fi at a source network.

In flow diagram 1300, at 1302, a tunneled packet associated with the Wi-Fi calling session is intercepted. The packet may be a packet that was either received from the UE or received from the SP network. At 1304, the intercepted packets may be copied (or mirrored) to a security analysis module in the Wi-Fi roaming exchange. At 1306, the security analysis module can analyze the copied packets and generate analysis information. Analyzing the packets can include unwrapping the packets by taking the headers off and analyzing the contents of the packets. The type of data and/or the type of protocol may be identified. For example, a Wi-Fi calling session may normally include RTP and SIP network traffic. The analysis information may be provided to a correlator module.

At 1308, control plane metadata of the Wi-Fi calling session may be correlated with the analysis information. In one example, the inner IP address of the UE in the SP network may be identified from a header in the packet. Control plane data that was obtained during the initialization of the Wi-Fi calling session may be accessed, and the IP address of the P-GW may be correlated to the IMSI of the UE.

At 1310, a determination can be made as to whether the analysis information indicates that a policy has been violated. For example, if the network traffic is using non-standard protocols (e.g., other than RTP or SIP), then this might constitute a violation of policy for the particular source network where the Wi-Fi calling session originated. If a determination is made that the intercepted network traffic violates a policy, then at 1312, an action can be taken based, at least in part, on the policy. Different actions may be taken based on different types of policy violations and depending on the particular source network for which the policy was configured. For example, if the network traffic is determined to be non-standard, then the policy for a particular source network may require the Wi-Fi calling session to be terminated. In another example, the policy for the source network may require an alert to be sent (e.g., to a network administrator) rather than, or in addition to, terminating the session. It will be apparent that any number of actions may be performed based on particular needs and implementations.

At 1314, a determination may be made as to whether more packets are traversing the secure tunnels of the Wi-Fi calling session. If more packets are detected, flow may return to 1302, where a packet is intercepted and the flow continues again. If no more packets are detected, or if an indication of session end is detected, then the flow may end.

If a policy is not determined to be violated at 1310, then flow may pass to 1322, of flow diagram 1320 in FIG. 13B. At 1322, a determination is made as to whether instructions to prioritize the UE flows in the source network were already sent. If so, this indicates that other intercepted packets were determined to not violate any policies. In this case, flow passes to 1314, in FIG. 13A.

If it is determined at 1322, that instructions were not previously sent to prioritize the UE flows in the source network, then this may indicate that the Wi-Fi calling session is newly established. Flow can pass to 1324 where a determination is made as to whether the type of data in the intercepted packets is typically used in Wi-Fi calling sessions. For example, if the type of data in the intercepted packet is not typically used in Wi-Fi calling sessions, then the network traffic may need further evaluation and should not be prioritized by the source network. Thus, flow can pass to 1314, in FIG. 13A.

If an RTP or SIP protocol is identified in the intercepted packet, or if a similar type of voice packet is identified in the intercepted packet, then it can be inferred that the Wi-Fi calling session is in a normal call state. In this case, flow can pass to 1326, where an evaluation can be made as to whether a policy requires prioritization of the Wi-Fi calling session by the source network. If policy does not require prioritization, then flow can pass to 1314, in FIG. 13A. However, if policy does require prioritization, then flow can pass to 1328 where a secure communication tunnel is established between the Wi-Fi roaming exchange (e.g., QoS integration server 731) and the source network. Then, at 1330, instructions may be sent to the source network to prioritize flows of the UE during the currently established Wi-Fi calling session.

Variations and Implementations

Within the context of the disclosure, communication system 10, which may include Wi-Fi calling system 700, represents a series of points, nodes, or network elements of interconnected communication paths for receiving and sending packets of information that propagate through communication system 10. Communication system 10 offers communication interfaces between sources and/or hosts, and may be any local area network (LAN), virtual local area network (VLAN), wireless local area network (WLAN), virtual private network (VPN), metropolitan area network (MAN), wide area network (WAN) such as the Internet, Intranet, Extranet, or any other appropriate architecture or system that facilitates communications in a network environment depending on the network topology. Communication system 10 can comprise any number of hardware and/or software elements coupled to (and in communication with) each other through a communication medium. Communication mediums may include any suitable communication link such as wireless technologies (e.g., IEEE 802.11x, 802.16, Wi-Fi, near field communication (NFC), DSRC, etc.), satellite, cellular technologies (e.g., 3G, 4G, WiMAX/LTE, GSM/WCDMA/HSPA, CDMA1x/EVDO, etc.), wire line technologies (e.g., Ethernet) or any suitable combination thereof. Generally, any suitable means of communication may be used: electric, sound, light, infrared, or radio.

Communications in a network environment are referred to herein as 'network traffic' or 'traffic', which may be inclusive of packets. A packet is a formatted unit of data, and can contain both control information (e.g., source and destination addresses, etc.) and data, which is also known as payload. Network traffic can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, replies, queries, etc. are forms of network traffic, and therefore, may comprise packets.

As used herein, the term 'network element' is meant to encompass any of the aforementioned elements, as well as routers, wireless LAN controllers (WLC) switches, wireless access points (WAPs), gateways, bridges, loadbalancers, appliances, firewalls, servers, processors, modules (any of which may be physical or virtually implemented on physical hardware) or any other suitable device, component, element, proprietary appliance, or object that is operable to exchange information in a network environment. A network element may include any suitable hardware, software, components, modules, interfaces, or objects that facilitate the operations thereof. This may be inclusive of appropriate algorithms and communication protocols that allow for the effective exchange of data or information.

In at least one example implementation, nodes with enterprise wireless calling capabilities include logic to achieve (or to foster) the activities as outlined herein. Note that in at least one example, each of these elements can have an internal structure (e.g., processors, memory elements, network interface cards, etc.) to facilitate some of the operations described herein. In some embodiments, these activities may be executed externally to these elements, or included in some other network element to achieve this intended functionality. In at least one embodiment these nodes may include logic (or reciprocating logic) that can coordinate with other network elements in order to achieve the operations, as outlined herein. Furthermore, one or several devices may include any suitable algorithms, hardware, firmware, software, components, modules, interfaces, or objects that facilitate the operations thereof.

In certain example implementations, the enterprise wireless calling functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by one or more processors or other similar machine, instructions in software, hardware, firmware, or any combination thereof, etc.). This tangible media may be non-transitory in at least one embodiment. In some of these instances, one or more memory elements can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements) can include memory for storing information to be used in achieving the enterprise wireless calling features, as outlined herein. Additionally, these network elements may include at least one processor that can execute software, an algorithm, or other instructions to perform the enterprise wireless calling operations, as disclosed herein. These network elements may further keep information, to be used in achieving the enterprise wireless calling activities as discussed herein, in any suitable memory element (random access memory (RAM), read only memory (ROM), EPROM, EEPROM, ASIC, etc.), software, hardware, or in any other suitable component, device, element, or object where appropriate and based on particular needs. Any of the memory items discussed herein (e.g., repositories, stores, databases, tables, caches, buffers, etc.) should be construed as being encompassed within the broad term 'memory element.' Similarly, any of the potential processing elements, modules, and machines described herein should be construed as being encompassed within the broad term 'processor.' Each of the network elements can also include suitable interfaces for receiving, transmitting, and/or otherwise communicating data or information in a network environment.

Note that the term 'end user' as used herein is intended to be inclusive of any type of computer device that can establish a network session with another node. This includes any type of user equipment, desktop, laptop, mobile Internet device, smart phone, tablet, personal digital assistant (PDA), terminal computer, or any other device, component, element, endpoint, or object capable of initiating voice, audio, video, media, or data exchanges within communication system 10. Such devices may also be inclusive of a suitable interface to the human user, such as a display element, a keyboard, a touchpad, a touch screen (including a multi-touch screen), a remote control, or any other terminal equipment.

Note that with the examples provided herein, interaction may be described in terms of two or more network elements and/or two or more clouds. However, this has been done for purposes of clarity and example only. In certain cases, it may be easier to describe one or more of the functionalities of a given set of flows by only referencing a limited number of network elements or clouds. It should be appreciated that the systems described herein are readily scalable and can accommodate a large number of components, as well as more complicated/sophisticated arrangements and configurations. Accordingly, the examples provided should not limit the scope or inhibit the broad teachings of the enterprise wireless calling features as potentially applied to a myriad of other architectures or implementations.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Although embodiments of a Wi-Fi calling system shown and described herein reference enterprises and enterprise networks, it should noted that the broad concepts of a Wi-Fi calling system detailed in this specification are not intended to be so limited. The concepts described herein relate to a Wi-Fi calling system that could be applied to any type of local area network that can provide Wi-Fi service to user equipment within a wireless range defined by the network access points, where the Wi-Fi service can enable access to the Internet via, for example, a service provider. Such a local area network is also referred to herein as a 'source network' and may be associated with an enterprise or any other suitable entity (e.g., event venue, school, government, restaurant, etc.).

It is also important to note that the activities, interactions, and operations shown and described herein illustrate only some of the possible scenarios and patterns that may be executed by, or within, the nodes with enterprise wireless calling capabilities. Some of these activities, interactions, and/or operations may be deleted or removed where appropriate, or may be modified or changed considerably without departing from the scope of the present disclosure. In addition, a number of these activities, interactions, and/or operations have been described as being executed concurrently with, or in parallel to, one or more additional activities, interactions, and/or operations. However, the timing of these activities, interactions, and/or operations may be altered considerably. The preceding operational flows have been offered for purposes of example and discussion. Substantial flexibility is provided by nodes with enterprise wireless calling capabilities in that any suitable arrangements, chronologies, configurations, and timing mechanisms may be provided without departing from the teachings of the present disclosure. Additionally, these activities can be facilitated by various modules and/or components which can be suitably combined in any appropriate manner, or partitioned in any appropriate manner, and which may be based on particular configuration and/or provisioning needs.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although embodiments herein have been illustrated with reference to particular elements and protocols, these elements and protocols may be replaced by any suitable architecture, protocols, and/or processes that achieve the intended functionality of nodes with enterprise wireless calling capabilities as disclosed herein.

What is claimed is:

1. A method, comprising:
   receiving one or more packets via a secure tunnel from a user device, wherein the user device is connected to a source network via a Wi-Fi access point;
   identifying control plane data associated with an ongoing Wi-Fi calling session;
   determining that a first packet of the one or more packets is associated with the Wi-Fi calling session by comparing information in the first packet with the control plane data, and in response to determining that the first packet is associated with the Wi-Fi calling session, analyzing the first packet to identify an anomaly in the first packet;
   determining that the established Wi-Fi calling session is a threat based, at least in part, on the identified anomaly of the first packet;
   taking a mitigating action in response to determining that the Wi-Fi calling session is a threat;
   receiving a second one or more packets via a second secure tunnel from a second user device, wherein the second user device is connected to the source network via a second Wi-Fi access point;
   identifying second control plane data associated with a second ongoing Wi-Fi calling session;
   determining that a second packet of the second one or more packets is associated with the second Wi-Fi calling session by comparing information in the second packet with the second control plane data, and in response analyzing the second packet to identify a potential anomaly in the second packet;
   determining that the second Wi-Fi calling session is not a threat based, at least in part, on the analyzing of the second packet;
   establishing a signaling link to the source network in response to determining that the second Wi-Fi calling session is not a threat; and
   sending a message to the source network over the signaling link to instruct the source network to prioritize network traffic associated with the second Wi-Fi calling session.

2. The method of claim 1, further comprising identifying a unique identity of the user device.

3. The method of claim 1, wherein the taking the action includes at least one of sending an alert that the Wi-Fi calling session is a threat and terminating the Wi-Fi calling session.

4. The method of claim 1, wherein the secure tunnel is an Internet Protocol Security (IPSec) tunnel.

5. The method of claim 1, wherein the one or more packets are intercepted in a second tunnel established between an evolved packet data gateway and a service provider network associated with the user device that initiated the Wi-Fi calling communication.

6. The method of claim 1, further comprising:
   receiving a request to establish the secure tunnel;
   identifying a service provider network associated with the user device;
   identifying a certificate representing the service provider; and
   sending the certificate to the user device.

7. The method of claim 1, wherein the Wi-Fi calling session is redirected from the user device to a Wi-Fi roaming exchange based on one of a Domain Name System (DNS) overwrite in the source network or a destination Internet Protocol address provided by a Network Address Translation (NAT) system in the source network.

8. The method of claim 1, further comprising:
   receiving one or more other packets of a second Wi-Fi calling session via a second secure tunnel from a second user device, wherein the second user device is connected to a second source network via a second Wi-Fi access point; and
   taking another action to protect the second network in response to determining that the second Wi-Fi calling session is another threat.

9. The method of claim 1, wherein the one or more packets of the Wi-Fi calling session are received, via the secure tunnel, by an evolved packet node gateway (ePDG) in one of a secure cloud or the source network.

10. The method of claim 1, wherein identifying the anomaly of the first packet comprises at least one of: (i) identifying an anomalous protocol used by the first packet, (ii) identifying an anomalous data type of the first packet, and (iii) identifying an anomalous port of the first packet.

11. The method of claim 1, wherein determining that the first packet of the one or more packets is associated with the Wi-Fi calling session by comparing information in the first packet with the control plane data comprises:
    comparing information in the first packet with at least one of: authentication, authorization, and accounting (AAA) records associated with the Wi-Fi calling session and call detail (CDR) records associated with the Wi-Fi calling session.

12. An apparatus, comprising:
    at least one memory; and
    logic implemented at least partly in hardware, the logic when executed operable to:
    receive one or more packets via a secure tunnel from a user device, wherein the user device is connected to a source network via a Wi-Fi access point;
    identify control plane data associated with an ongoing Wi-Fi calling session;
    determine that a first packet of the one or more packets is associated with the Wi-Fi calling session by comparing information in the first packet with the control plane data, and in response to determining that the first packet is associated with the Wi-Fi calling session, analyzing the first packet to identify an anomaly in the first packet;
    determine that the established Wi-Fi calling session is a threat based, at least in part, on the identified anomaly of the first packet;
    take a mitigating action in response to determining that the Wi-Fi calling session is a threat;
    receive a second one or more packets via a second secure tunnel from a second user device, wherein the second user device is connected to the source network via a second Wi-Fi access point;
    identify second control plane data associated with a second ongoing Wi-Fi calling session;
    determine that a second packet of the second one or more packets is associated with the second Wi-Fi calling session by comparing information in the second packet with the second control plane data, and in response analyzing the second packet to identify a potential anomaly in the second packet;
    determine that the second Wi-Fi calling session is not a threat based, at least in part, on the analyzing of the second packet;

establish a signaling link to the source network in response to determining that the second Wi-Fi calling session is not a threat; and send a message to the source network over the signaling link to instruct the source network to prioritize network traffic associated with the second Wi-Fi calling session.

13. The apparatus of claim 12, wherein the action includes at least one of sending an alert that the Wi-Fi calling session is a threat and terminating the Wi-Fi calling session.

14. The apparatus of claim 12, wherein the logic when executed is operable to:
receive a request to establish the secure tunnel;
identify a service provider network associated with the user device;
identify a certificate representing the service provider; and
send the certificate to the user device.

15. The apparatus of claim 12, wherein identifying the anomaly of the first packet comprises at least one of: (i) identifying an anomalous protocol used by the first packet, (ii) identifying an anomalous data type of the first packet, and (iii) identifying an anomalous port of the first packet.

16. At least one non-transitory, machine readable storage medium having instructions stored therein, the instructions, when executed by at least one processor, configured to cause the at least one processor to:
receive one or more packets via a secure tunnel from a user device, wherein the user device is connected to a source network via a Wi-Fi access point;
identify control plane data associated with an ongoing Wi-Fi calling session;
determine that a first packet of the one or more packets is associated with the Wi-Fi calling session by comparing information in the first packet with the control plane data, and in response to determining that the first packet is associated with the Wi-Fi calling session, analyzing the first packet to identify an anomaly in the first packet;
determine that the established Wi-Fi calling session is a threat based, at least in part, on the identified anomaly of the first packet;
take a mitigating action in response to determining that the Wi-Fi calling session is a threat;
receive a second one or more packets via a second secure tunnel from a second user device, wherein the second user device is connected to the source network via a second Wi-Fi access point;
identify second control plane data associated with a second ongoing Wi-Fi calling session;
determine that a second packet of the second one or more packets is associated with the second Wi-Fi calling session by comparing information in the second packet with the second control plane data, and in response analyzing the second packet to identify a potential anomaly in the second packet;
determine that the second Wi-Fi calling session is not a threat based, at least in part, on the analyzing of the second packet;
establish a signaling link to the source network in response to determining that the second Wi-Fi calling session is not a threat; and send a message to the source network over the signaling link to instruct the source network to prioritize network traffic associated with the second Wi-Fi calling session.

17. The at least one non-transitory machine-readable storage medium of claim 16, wherein the one or more packets are intercepted in a second secure tunnel established between an evolved packet data gateway and a service provider network associated with the user device that initiated the Wi-Fi calling communication.

18. A method, comprising:
receiving a packet from a user device connected to a source network via a Wi-Fi access point;
identifying control plane data associated with an ongoing Wi-Fi calling session;
determining that the packet is associated with the Wi-Fi calling session by comparing information in the packet with the control plane data;
identifying the user device;
in response to determining that the packet is associated with the Wi-Fi calling session, determining that the user device is compromised based, at least in part, on one or more prior Wi-Fi calling sessions initiated by the user device;
taking a mitigating action based, at least in part, on a policy, in response to determining that the user device is compromised;
receiving a second one or more packets via a second secure tunnel from a second user device, wherein the second user device is connected to the source network via a second Wi-Fi access point;
identifying second control plane data associated with a second ongoing Wi-Fi calling session;
determining that a second packet of the second one or more packets is associated with the second Wi-Fi calling session by comparing information in the second packet with the second control plane data, and in response analyzing the second packet to identify a potential anomaly in the second packet;
determining that the second Wi-Fi calling session is not a threat based, at least in part, on the analyzing of the second packet;
establishing a signaling link to the source network in response to determining that the second Wi-Fi calling session is not a threat; and
sending a message to the source network over the signaling link to instruct the source network to prioritize network traffic associated with the second Wi-Fi calling session.

19. The method of claim 18, further comprising:
identifying a service provider associated with the user device;
identifying a certificate representing the service provider; and
sending the certificate to the user device in response to determining that the user device is authenticated.

20. The method of claim 18, further comprising:
terminating the Wi-Fi calling communication in response to determining that the user device is compromised.

* * * * *

UNITED STATES PATENT AND TRADEMARK OFFICE
CERTIFICATE OF CORRECTION

PATENT NO. : 10,341,300 B2
APPLICATION NO. : 15/044957
DATED : July 2, 2019
INVENTOR(S) : Mark Grayson et al.

Page 1 of 1

It is certified that error appears in the above-identified patent and that said Letters Patent is hereby corrected as shown below:

In the Drawings

On sheet 8 of 14, in Figure 10, reference numeral 1024, Line 2, delete "FDQN" and insert -- FQDN --, therefor.

In the Specification

In Column 2, Line 31, delete "embodiment" and insert -- embodiment; --, therefor.

In Column 3, Line 28, delete "node" and insert -- data --, therefor.

In Column 8, Line 13, delete "(IMSI))." and insert -- (IMSI). --, therefor.

In Column 23, Line 61, delete "FDQN" and insert -- FQDN --, therefor.

In Column 24, Line 6, delete "FDQN" and insert -- FQDN --, therefor.

In Column 30, Line 32, delete "loadbalancers," and insert -- load balancers, --, therefor.

In Column 32, Line 24, after "should" insert -- be --.

In the Claims

In Column 34, Line 16, in Claim 9, delete "node" and insert -- data --, therefor.

Signed and Sealed this
Fifth Day of November, 2019

Andrei Iancu
*Director of the United States Patent and Trademark Office*